(12) United States Patent
Lerner et al.

(10) Patent No.: US 7,482,607 B2
(45) Date of Patent: Jan. 27, 2009

(54) METHOD AND APPARATUS FOR PRODUCING X-RAYS, ION BEAMS AND NUCLEAR FUSION ENERGY

(75) Inventors: Eric J. Lerner, West Orange, NJ (US); Aaron Blake, Hanscom AFB, MA (US)

(73) Assignee: Lawrenceville Plasma Physics, Inc., West Orange, NJ (US)

( * ) Notice: Subject to any disclaimer, the term of this patent is extended or adjusted under 35 U.S.C. 154(b) by 487 days.

(21) Appl. No.: 11/365,105

(22) Filed: Feb. 28, 2006

(65) Prior Publication Data
US 2007/0201598 A1 Aug. 30, 2007

(51) Int. Cl.
*H01J 49/00* (2006.01)
(52) U.S. Cl. ............... 250/493.1; 250/504 R; 250/423 R
(58) Field of Classification Search ............... 250/493.1, 250/423 R
See application file for complete search history.

(56) References Cited

U.S. PATENT DOCUMENTS

| | | | | |
|---|---|---|---|---|
| 3,456,113 | A | * | 7/1969 | Keepin ............... 376/254 |
| 3,946,236 | A | | 3/1976 | Roberts et al. |
| 4,023,065 | A | | 5/1977 | Koloc |
| 4,182,650 | A | | 1/1980 | Fischer |
| 4,446,096 | A | * | 5/1984 | Auchterlonie ............... 375/145 |
| 4,912,731 | A | | 3/1990 | Nardi |
| 5,075,522 | A | | 12/1991 | Nardi |
| 6,172,324 | B1 | | 1/2001 | Birx |
| 6,396,213 | B1 | | 5/2002 | Koloc |
| 6,654,433 | B1 | | 11/2003 | Boscoli |
| 6,850,011 | B2 | | 2/2005 | Monkhorst et al. |
| 6,891,911 | B2 | | 5/2005 | Rostoker et al. |
| 6,894,446 | B2 | | 5/2005 | Monkhorst et al. |
| 7,002,148 | B2 | | 2/2006 | Monkhorst et al. |
| 7,002,168 | B2 | | 2/2006 | Jacob et al. |
| 2001/0046273 | A1 | | 11/2001 | Koloc |
| 2005/0054662 | A1 | | 3/2005 | Hennequin et al. |

OTHER PUBLICATIONS

Lerner, E.J. "Magnetic self-compression in laboratory plasmas, quasars and radio galaxies I, II," Laser and Particle Beams, 4(Pt. 2):193-213 (1986).

(Continued)

*Primary Examiner*—David A. Vanore
(74) *Attorney, Agent, or Firm*—Edwin S. Flores; Daniel J. Chalker; Chalker Flores, LLP

(57) ABSTRACT

The present invention includes an apparatus and method for producing x-rays, and/or ion beams and for enabling the generation of fusion energy and the conversion of the energy into electrical energy including an anode and a cathode positioned coaxially and at least partially within a reaction chamber that imparts an angular momentum to a plasmoid. The angular momentum may be imparted through the cathode having a helical twist; a helical coil about the cathode or a combination thereof. The anode has an anode radius and the cathode has a cathode radius that imparts a high magnetic field. The reaction chamber contains a gas and an electronic discharge source in electrical communication with the anode and the cathode. As a result of an electronic discharge a dense, magnetically confined, plasmoid is created about the anode and emits of one or more particles.

42 Claims, 8 Drawing Sheets

OTHER PUBLICATIONS

Lerner, E.J. "Prospects for P11B Fusion with the Dense Plasma Focus: New Results" Proceedings of the 5th Symposium "Current Trends in International Fusion Research: A Review" Mar. 24-28, 2003, Washington, D.C, also http://arxiv.org/abs/physics/0401126.

Miller, G.S., et al, "Deceleration of infalling plasma in the atmospheres of accreting neutron stars. I—Isothermal atmospheres," Astrophysical Journal, 314:215 (1987).

* cited by examiner

METHOD AND APPARATUS FOR PRODUCING X-RAYS, ION BEAMS AND NUCLEAR FUSION ENERGY

TECHNICAL FIELD OF THE INVENTION

The present invention relates in general to the field of plasma physics and the plasma focus device, and more particularly, to methods and apparatus for confining plasma using a high magnetic field and the injection of angular momentum to produce ion beams and/or x-rays and to enable nuclear fusion and the generation of electricity from fusion energy.

BACKGROUND OF THE INVENTION

Without limiting the scope of the invention, its background is described mainly in connection with fusion energy. The increase in energy consumption and the disadvantages of hydrocarbon fuels has led to a search for alternate sources of energy. One such source is fusion energy from a thermonuclear fusion reactor, which offers an almost limitless source of energy. However, there are many scientific and engineering challenges.

Generally, a fusion reactor includes a fusion fuel, often a mixture of deuterium and tritium, that is heated to very high temperatures and confined for some time in a plasma state. The plasma state is generated using electrical energy. The plasma state contains ions that have sufficient energy to fuse. To fuse, the ions must be held together long enough for fusion to occur, e.g., magnetic confinement. Generally, the products of the fusion reaction may include elements such as helium, a neutron and energy. The energy released in most nuclear reactions is much larger than that for chemical reactions, because the binding energy that holds a nucleus together is far greater than the energy that holds electrons to a nucleus. In most reactor designs, the energy from the reaction is eventually collected as thermal energy which is subsequently converted into electricity.

There have been many fusion devices including the tokamak (i.e., a Russian word for a torus-shaped magnetic chamber) stellarator, z-pinch, spherical pinch, magnetized target fusion, laser, ion or electron beam and spheromak; however, these devices have not yet succeeded. One difficulty with the plasma heating approach has been instability in the plasma during the heating phase that has prevented the magnetic fields from being able to contain the heated, ionized gas for sufficient time to even reach the breakeven point in energy production.

One such method and apparatus for generating and utilizing a compound plasma configuration is taught in U.S. Pat. No. 4,023,065 issued to Koloc, which teaches a plasma configuration that includes a central toroidal plasma with electrical currents surrounded by a generally ellipsoidal mantle of ionized particles or electrically conducting matter. The methods of forming this compound plasma configuration include the steps of forming a helical ionized path in a gaseous medium and simultaneously discharging a high potential through the ionized path to produce a helical or heliform current which collapses on itself to produce a toroidal current, or generating a toroidal plasmoid, supplying magnetic energy to the plasmoid, and applying fluid pressure external to the plasmoid.

Another approach is the pulsed nuclear fusion reactor taught in U.S. Pat. No. 4,182,650 issued to Fischer, which relates to a nuclear fusion power plant for producing useful electrical energy by nuclear combustion of deuterium and lithium to helium. A large concentric plate capacitor is discharged rapidly through a mass of molten LiD that is situated at its center. Before this discharge, a conducting path had been thermally preformed between the electrodes by an alternating current pulse and the high-temperature, high-pressure plasma is confined by the LiD liquid in a narrow channel. Neutrons are generated, partly by thermonuclear fusion, partly by suprathermal collisions which result from the well-known sausage instability. The escaping neutrons are absorbed by the surrounding liquid where they produce heat. The heat, radiation and mechanical shock are absorbed in the liquid which flows through a heat exchanger in order to energize the associated turbogenerator power plant.

Still another approach is a compound plasma configuration and method and apparatus for generating a compound plasma configuration taught in U.S. Patent Publication No. 20010046273 to Paul M. Koloc, which relates to a compound plasma configuration formed from a device having pins and an annular electrode surrounding the pins. A cylindrical conductor is electrically connected to, and coaxial with, the annular electrode, and a helical conductor coaxial with the cylindrical conductor. The helical conductor is composed of wires, each wire electrically connected to each pin. The annular electrode and the pins are disposed in the same direction away from the interior of the conducting cylinder.

The dense plasma focus (DPF) has been studied as a possible solution to the problem of instabilities. In this device, natural plasma instabilities are used to create confinement in a dense plasmoid, rather than being minimized as in other fusion devices. One such method and apparatus for a dense plasma focus radiation source for generating EUV radiation including a coaxially disposed anode and cathode is taught in U.S. Pat. No. 7,002,168 issued to Jacob, et al. The methods and apparatuses for enhancing the efficiency of EUV radiation production, for protecting, cooling and extending the life of the anode and cathode, for protecting and shielding collecting optics from debris and pressure disturbances in the discharge chamber, and for feeding Lithium into the discharge chamber.

Another plasma focus radiation source for generating radiation at a selected wavelength is taught in U.S. Pat. No. 6,172,324 issued to Birx, which teaches producing a high energy plasma sheathe that moves down an electrode column at high speed and is pinched at the end of the column to form a very high temperature spot. An ionizable gas introduced at the pinch can produce radiation at the desired wavelength. In order to prevent separation of the plasma sheathe from the pinch, and therefore to prolong the pinch and prevent potentially damaging restrike, a shield of a high temperature non-conducting material is positioned a selected distance from the center electrode and shaped to redirect the plasma sheathe to the center electrode, preventing separation thereof. An opening is provided in the shield to permit the desired radiation to pass substantially unimpeded.

However, the DPF has also not yet achieved breakeven conditions and has never simultaneously achieved a high efficiency of transfer of energy into the plasmoid, high ion energy and high density. In addition, the DPF suffers from a high degree of variation in output from shot to shot even with identical initial conditions.

In addition to its application as a fusion reactor, the DPF has other important potential applications as a source of x-rays, ion beams and neutrons. Such applications include x-ray lithography, x-ray and neutron inspection, and medical isotope production. However, its application in these areas has also been hampered by its high degree of variability.

Attempts to overcome this variability have not been entirely successful. A plasma focus apparatus is taught in U.S. Pat. Nos. 5,075,522 and 4,912,731 issued to Nardi, which teaches plasma focus apparatus with a field distortion element in the interelectrode gap at the breech end displaced from the sleeve of insulating material between the electrodes. As a result the neutron yield of the accelerator is at least 5 times the yield in the absence of the field distortion element, e.g., in the shape of a knife blade.

A further difficulty of most approaches to fusion is that they rely on deuterium-tritium fuel, which produces high-energy neutrons. The neutrons generate induced radioactivity in the reactor structure. As well, the neutron energy must be captured as heat and converted to electricity by a standard steam cycle, which is very expensive and prevents any substantial reduction in the cost of electricity.

Alternate, advanced fuels that produce only charged particles could overcome this problem. It has long been recognized that the pB11 reaction, which produces 3 He4 ions and 8.7 MeV of energy, has great advantages as a fusion fuel. It produces only charged particles and thus the energy of the reaction can be converted directly into electricity, avoiding the very costly step of converting heat energy into electricity via a turbine and mechanical generator. This can lead to radical reduction in the cost of electricity. In addition, the reaction avoids the production of neutrons, which can induce radioactivity. A secondary reaction, B11+He4→n+N14 does produce approximately 0.2% of total energy in the form of low energy neutrons, but they have too little energy to activate reactor materials. Attempts have been made to use the pB11 reaction in fusion reactor designs.

One such method and apparatus for controlled fusion in a field reversed configuration and direct energy conversion is taught in U.S. Pat. Nos. 7,002,148, 6,894,446 and 6,850,011 issued to Monkhorst, et al., which teaches plasma ions magnetically confined in the FRC while plasma electrons are electrostatically confined in a deep energy well, created by tuning an externally applied magnetic field. Ions and electrons may have adequate density and temperature so that upon collisions they are fused together by the nuclear force, thus forming fusion products that emerge in the form of an annular beam. Energy is removed from the fusion product ions as they spiral past electrodes of an inverse cyclotron converter.

Another method and apparatus for the formation of a field reversed configuration for magnetic and electrostatic confinement of plasma is taught in U.S. Pat. No. 6,891,911 issued to Rostoker, et al., which teaches a Field Reversed Configuration (FRC) magnetic topology in which plasma ions are contained magnetically in stable, non-adiabatic orbits in the FRC. Further, the electrons are contained electrostatically in a deep energy well, created by tuning an externally applied magnetic field. The simultaneous electrostatic confinement of electrons and magnetic confinement of ions avoids anomalous transport and facilitates classical containment of both electrons and ions. In this configuration, ions and electrons may have adequate density and temperature so that upon collisions they are fused together by nuclear force, thus releasing fusion energy. Moreover, the fusion fuel plasmas that can be used with the present confinement system and method are not limited to neutronic fuels only, but also advantageously include advanced fuels.

However, these attempts have not been successful so far as there are substantial technical challenges to using pB11. To use pB11 fuel the ion energies must be in excess of 100 KeV, simultaneously with density-confinement time products of more than $3 \times 10^{15}$ particle-sec/cc. The higher atomic change, Z, of B11 greatly increases the x-ray emission rate, which is proportional to $Z^2$ making it difficult to achieve ignition, e.g., the point at which the thermonuclear power exceeds the x-ray emission.

Finally, conversion of energy to electricity from both the ion beams and x-rays must be performed with high efficiencies. For high-energy x-rays this problem has not yet been solved in a practical manner.

The foregoing problems have been recognized for many years and while numerous solutions have been proposed, none of them adequately address all of the problems in a single device.

SUMMARY OF THE INVENTION

The present inventor recognized a need for a compact and inexpensive device that produces x-rays, and ion beams, while generating no radioactivity and no, or almost no, neutrons. A need was recognized to eliminate the need for the usual deuterium-tritium mix. The present inventor recognized that a plasma focus device, e.g., using a hydrogen-boron reaction can supply an environmentally safe, cheap, and effectively an unlimited energy source. The device disclosed herein also produces x-rays, and ion beams with little or no radioactivity production and no, or almost no, neutrons. The device disclosed herein can also enable nuclear fusion and the conversion of fusion energy into electricity.

For example, the present invention provides a device for producing x-rays and particle beams having an anode and a cathode positioned coaxially and at least partially within a reaction chamber to impart an angular momentum on a plasmoid. In some embodiments the cathode has a helical twist that imparts angular momentum. In others, a helical coil is positioned about the cathode to impart angular momentum. Alternatively, a cathode with a helical twist and a helical coil is positioned about the cathode may be used to impart angular momentum. In some embodiments, the anode has an anode radius and the cathode has a cathode radius that imparts a high magnetic field. In these embodiments, the anode radius is between about 0.25 cm and about 1.5 cm times the peak current measured in mega-amperes in the device and the cathode radius is between about 0.5 cm and about 3 cm times the peak current measured in mega-amperes in the device. A gas is contained within the reaction chamber to contact the anode and the cathode and a source of gas is connected to the reaction chamber. An electronic discharge source is in electrical communication with the anode and the cathode to provide an electronic discharge. The electronic discharge results in a dense, magnetically confined, plasmoid being created about the anode capable of emitting one or more ions.

The present invention also provides a plasma generator to enable nuclear fusion that includes an anode and a cathode positioned coaxially and at least partially within a reaction chamber. The anode has an anode radius and the cathode has a cathode radius that imparts a high magnetic field. Generally, the anode radius is between about 0.25 cm and about 1.5 cm times the peak current measured in mega-amperes in the device and the cathode radius is between about 0.5 cm and about 3 cm times the peak current measured in mega-amperes in the device. A borane fuel is contained within the reaction chamber. In some embodiments, the cathode has a helical twist that imparts angular momentum. In others, a helical coil is positioned about the cathode to impart angular momentum. Alternatively, a cathode with a helical twist and a helical coil is positioned about the cathode may be used to impart angular momentum. An electronic discharge source is in electrical communication with the anode and the cathode, to create a plasmoid about the anode. The plasmoid results in the emission of one or more x-rays and an ion beam from the borane fuel.

Furthermore, a method for producing x-rays and particle beams is provided by the present invention. The method includes interconnecting a gas with an anode and a cathode in electrical communication with an electronic discharge. In some embodiments, the anode has an anode radius and the cathode has a cathode radius that imparts a high magnetic field. Generally, the anode radius is between about 0.25 cm and 1.5 cm times the peak current measured in mega-amperes in the device and the cathode radius is between about 0.5 cm and about 3 cm times the peak current measured in mega-amperes in the device. In some embodiments the cathode has a helical twist that imparts angular momentum. In others, a helical coil is positioned about the cathode to impart angular momentum. Alternatively, a cathode with a helical twist and a helical coil is positioned about the cathode may be used to impart angular momentum. An electric current is used to form a plasma sheath through the discharge of an electrical current pulse across the anode and the cathode and a plasmoid is formed about the anode as a result of the magnetic field generated by the current sheath. One or more charged particles and one or more x-rays are emitted from the plasmoid as a result of the decay of the plasmoid's magnetic field.

The present invention provides a generator that produces x-rays and particle beams that includes a reaction chamber and an electronic discharge system. The reaction chamber includes a gas, a cathode positioned coaxially about an anode at least partially within the reaction chamber. The electronic discharge system includes a power source in electrical communication with the anode and the cathode. In some embodiments, the anode has an anode radius and the cathode has a cathode radius that imparts a high magnetic field. Generally, the anode radius is between about 0.25 cm and 1.5 cm times the peak current measured in mega-amperes in the device and the cathode radius is between about 0.5 cm and about 3 cm times the peak current measured in mega-amperes in the device. In some embodiments the cathode has a helical twist that imparts angular momentum. In others, a helical coil is positioned about the cathode to impart angular momentum. Alternatively, a cathode with a helical twist and a helical coil is positioned about the cathode may be used to impart angular momentum. The power source provides an electronic discharge about the anode to produce a plasmoid that emits one or more ions and one or more x-rays from the gas.

In addition, some embodiments include an x-ray energy converter for directly converting the x-ray emission into electrical energy. The x-ray energy converter for directly converting the emission of one or more x-ray bursts into electrical energy is in communication with an x-ray burst source and the energy storage unit. The x-ray energy converter for directly converting x-ray emissions into electrical energy. The collector includes one or more electron emitter layers in electrical communication with one or more electron collector layers. The one or more electron emitter layers adsorb the one or more x-rays and emits electrons that are adsorbed by the one or more electron collector layers.

Furthermore, a method of converting fusion energy into electrical energy is provided by the present invention. The method includes using an x-ray energy converter and an ion beam converter to capture the x-ray and ion beam energy, convert them to electric energy and store the electric energy in storage devices.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
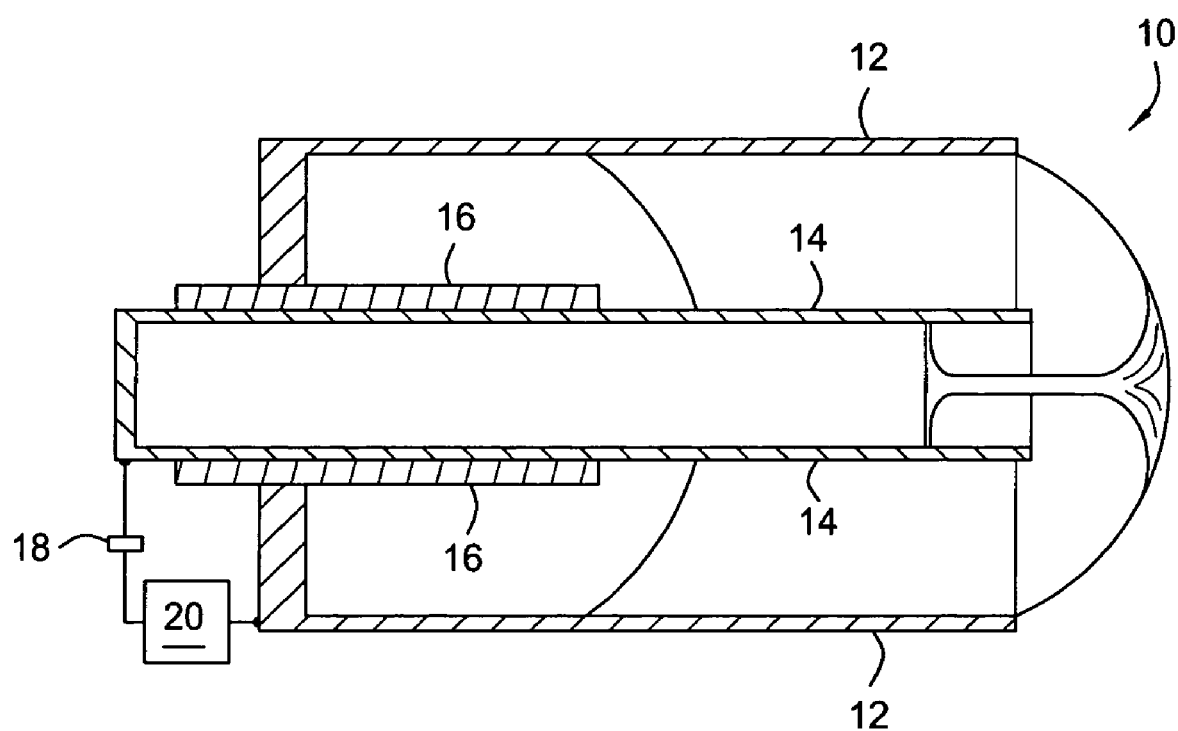
FIG. 1 is a side view of the plasma focus device of the present invention.

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The plasma focus device of the present invention includes a nested electrode design having a hollow cylinder anode centrally positioned among one or more cathodes positioned to impart angular momentum. In one embodiment the one or more cathodes are positioned at a helical angle with the angle depending on the particular application, but generally in the range of about 0.3 degrees but may range between about 0.05 and about 10 degrees. Another embodiment uses a helical coil positioned about the cathode to impart angular momentum.

Alternatively, a cathode with a helical twist and a helical coil positioned about the cathode may be used to impart angular momentum.

Generally, the present invention provides a device for producing x-rays and ion beams and to enable nuclear fusion and the generation of electricity from fusion energy that includes a mechanism to impart an angular momentum to generate a dense, magnetically confined, plasmoid within a gas filled reaction chamber that generates one or more particles and x-rays. In some embodiments, the anode has an anode radius and the cathode has a cathode radius that imparts a high magnetic field. In these embodiments, the anode radius is between about 0.25 cm and 1.5 cm times the peak current measured in mega-amperes in the device and the cathode radius is between about 0.5 cm and about 3 cm times the peak current measured in mega-amperes in the device. In some embodiments of the present invention, the cathode has a helical twist that imparts angular momentum or a helical coil is positioned about the cathode to impart angular momentum. Alternatively, a cathode with a helical twist and a helical coil is positioned about the cathode may be used to impart angular momentum.

For example, the present invention also provides a device for producing x-rays and particle beams that has an anode and a cathode positioned coaxially and shaped to impart an angular momentum on a plasmoid and a gas contained within the reaction chamber. The device includes an electronic discharge source in electrical communication with the anode, the cathode and a dense, magnetically confined, plasmoid is created about the anode as a result of an electronic discharge and emits one or more particles and x-rays.

The reaction chamber houses an anode, a cathode and a gas. Generally, the reaction chamber is a vacuum chamber having connections for the anode and a cathode and other components of the electronic discharge source. In addition, the reaction chamber may have one or more connections to allow the induction and/or removal of one or more gases into the reaction chamber. The skilled artisan will recognize that the shape and dimensions of the particular reaction chamber will depend on the size of the electrodes, position of the electrodes, volume of the chamber and so forth.

The anode and the cathode are separated by an insulator and positioned coaxially and at least partially within a reaction chamber. The present invention provides the cathode positioned to impart an angular momentum on a plasmoid. The cathode may be positioned at an angle relative to the base or the anode to induce angular momentum. The relative angle of the cathode dependents on the specific design of the particular embodiment taking into account the amount of angular momentum to be added or removed. For example, the cathode of the present invention provides a helical configuration around the anode that imparts angular momentum to the plasmoid. One embodiment of the present invention provides electrodes having a length of about 4 cm, a helical tilt of about 0.3 degrees or an initial axial magnetic field of about 200 G. For other electrodes, the tilt may vary from 0.05 to 10 degrees and the field from 5 to 1,000 G.

In embodiments for fusion energy generation, the anode has an anode radius and the cathode has a cathode radius that imparts a high magnetic field. In these embodiments, the anode radius is between about 0.25 cm and 1.5 cm times the peak current measured in mega-amperes in the device and the cathode radius is between about 0.5 cm and about 3 cm times the peak current measured in mega-amperes in the device. These high-field electrodes may or may not be used in embodiments for non-fusion applications.

The anode and cathode may individually be constructed from a variety of materials. For example, one material is beryllium, which allows the high x-ray emission to mainly pass through beryllium. Another material that may be used to construct the anode and/or the cathode is copper; however, the high x-ray emission will erode the copper anode quickly. In addition, the cathode and/or the anode may be made partially from metals (e.g., Aluminum, copper, aluminum, beryllium, chromium, copper, gold, nickel, molybdenum, palladium, platinum, silver, tantalum, titanium, tungsten and zinc) and alloys (e.g., copper-alloy, beryllium-alloy, copper-beryllium-alloy, Aluminum-alloy and other metal alloys). The cathode and/or the anode may also include a variety of dopants, e.g., beryllium, tungsten, molybdenum, rhenium, etc.

Another embodiment of the present invention imparts angular momentum using a magnetic field induced using a helical coil positioned about the cathode. The helical coil, which in-turn imparts angular momentum, generates an initial axial magnetic field. Additionally, the helical coil may be connected to a separate power source that is energized independently of the main power supply. Yet another embodiment of the plasma focus device of the present invention, introduces angular momentum using both a nested electrode design having a hollow cylinder anode centrally positioned among one or more helical cathodes positioned to impart angular momentum and a helical coil positioned about the one or more helical electrodes that generates a magnetic field to impart angular momentum and a helical coil positioned about the one or more helical electrodes that generates a magnetic field to impart angular momentum.

The insulator that separates the anode and the cathode may be made from a variety of materials depending on the particular application. For example, the insulator material may be made at least partially from quartz, pyrex glass, lava rock, ceramic, ceramic oxides and nitrides of aluminum, beryllium, boron, calcium, silicon, sodium and zirconium, boron carbide and combinations thereof. In addition, insulators may be machined, formed or shaped by conventional processes to the desired size, shape, thickness and profile. Other insulating material such as ceramic, ceramic oxides and nitrides made from aluminum, beryllium, boron, calcium, silicon and zirconium, e.g., Alumina ($Al_2O_3$), Silicon Nitride ($Si_3N_4$), Aluminum Nitride, Beryllium Oxide (BeO), Boron Carbide ($B_4C$), Zirconia ($ZrO_2$) and combinations thereof, may also be used. Selection of the insulator material will depend upon the size, and current range of the device.

Generally, a plasma can be formed from a variety of gas phase molecules that serve as an ion source. For example, gases used in the present invention for fusion energy generation include decaborane (B10H14) and pentaborane. Decaborane is a compound, which is an excellent source material because each decaborane molecule when vaporized and ionized can provide a molecular ion of ten boron atoms. However, other boron-containing compounds like borohydrides and boranes may be used e.g., borane, diborane, hexaborane, heptaborane, nonaborane, octaborane, triborane, and tetraborane. When the device is used for non-fusion applications, many other gases may be used including hydrogen, helium, methane, nitrogen, argon, neon, and xenon.

The present invention generates one or more particles, which includes one or more ion beams, one or more x-rays or combinations thereof. For fusion generation applications, an energy conversion device may be used to convert the ion beam energy and x-ray energy to electrical energy. The energy conversion device includes an ion beam converter and an x-ray converter. The ion beam converter and an x-ray converter may be incorporated into one device or separate devices depending on the needs of the particular application. In some embodiments for fusion applications, only one or neither of the converters are used. For non-fusion applications, no energy conversion devices need be used.

The x-ray energy converter may be separated from the reactor chamber by a thin wall of a suitable material such as beryllium; however, the skilled artisan will recognize that other materials may be used. The x-ray energy converter includes one or more capacitors in electrical communication with one or more electron emitter layers and one or more electron collector layers. The one or more electron emitter layers adsorb the x-rays and emit electrons that are then adsorbed by the one or more electron collector layers. The x-ray energy converter may be a series of one or more x-ray energy converters positioned to collect x-rays of different energy levels. For example, the one or more x-ray energy converters may be nested concentrically with each x-ray energy converter having one or more electron emitter layers and one or more electron collector layers. Additionally, the x-ray energy converter may have one or more electron emitter layers or one or more electron collector layers in which some layers may be nested concentrically to collect x-rays of different energy levels. The one or more electron emitter layers adsorb the x-rays and emit electrons that are then adsorbed by the one or more electron collector layers. Similarly, the one or more electron collector layers may be positioned to absorb emissions of different energy. Generally, each of the one or more electron collector layers are separated by a voltage of between about 15 and about 25% relative to the next electron collector layer; however, the electron collector layers may be separated by a voltage of between about 10 and about 30% relative to the next electron collector layer depending on the particular application.

Another embodiment of the present invention includes a plasma generator for producing electrical power from fusion energy. The generator includes an anode and a cathode positioned coaxially and at least partially within a reaction chamber, wherein the cathode imparts angular momentum. The anode has an anode radius and the cathode has a cathode radius that imparts a high magnetic field, the anode radius is between about 0.25 cm and 1.5 cm times the peak current measured in mega-amperes in the device and the cathode radius is between about 0.5 cm and about 3 cm times the peak current measured in mega-amperes in the device. Contained within the reaction chamber is a borane fuel source in the gaseous form. An electronic discharge source is in electrical communication with the anode and the helically twisted cathode to create a plasmoid about the anode for the emission of one or more x-rays and an ion beam from the borane fuel source.

The present invention includes a method for producing x-rays and particle beams from a gas with an anode and an at least partially helical cathode in electrical communication with an electronic discharge source. A plasma sheath with a magnetic field is formed through the discharge of an electrical current pulse across the anode and the at least partially helical cathode to form a plasmoid about the anode. One or more charged particles and x-rays are emitted from the plasmoid as a result of the decay of the magnetic field of the plasmoid and the collisions of the plasmoid, electrons and ions.

The reaction chamber that houses the anode, cathode and gas is a vacuum chamber having connections for the anode and a cathode and other components of the electronic discharge source. The gas may be a borane or other gas including hydrogen, helium, nitrogen, methane, neon, argon, or xenon. In addition, the reaction chamber may have one or more connections to allow the induction and/or removal of one or more gases in to the reaction chamber. In some embodiments, the reaction chamber is positioned so that there is communication between the reaction chamber and a particle capturing device. The skilled artisan will recognize that the shape and dimensions of the particular reaction chamber will depend on the size of the electrodes, position of the electrodes, volume of the chamber and so forth.

The anode and cathode positioned coaxially at least partially within the reaction chamber and separated by an insulator. The present invention provides the cathode with a shape that imparts an angular momentum on a plasmoid by positioning the cathode at an angle to induce angular momentum. The relative angle is dependent on the specific design of the particular embodiment taking into account the amount of angular momentum to be added or removed.

The anode and cathode may individually be constructed from a variety of materials, e.g., beryllium, copper, etc., which allows the high x-ray emission to mainly pass through beryllium. Another material that may be used to construct the anode and/or the cathode is copper; however, the high x-ray emission will erode the copper anode quickly. In addition, the cathode and/or the anode may be made partially from metals (e.g., Aluminum, copper, aluminum, beryllium, chromium, copper, gold, nickel, molybdenum, palladium, platinum, silver, tantalum, titanium, tungsten and zinc) and alloys (e.g., copper-alloy, beryllium-alloy, copper-beryllium-alloy, Aluminum-alloy and other metal alloys). The cathode and/or the anode may also include a variety of dopants, e.g., beryllium, tungsten, molybdenum, rhenium, etc.

The method for producing x-rays, ion beams and/or particle beams includes a nested electrode design having a hollow cylinder anode centrally positioned among one or more cathodes positioned to impart angular momentum. The one or more helical cathodes are positioned at a helical angle with the angle depending on the particular application, but generally about 0.3 degrees, but may range between about 0.05 and about 10 degrees.

Another embodiment of the present invention used for producing one or more particles includes a magnetic field generated by a helical coil positioned about the anode and cathode. An initial axial magnetic field is generated by means of a helical coil, which in-turn imparts angular momentum. Additionally, the helical coil may be connected to a separate power source that is energized separately from the main power supply.

In another embodiment, the anode has an anode radius and the cathode has a cathode radius that imparts a high magnetic field. In these embodiments, the anode radius is between about 0.25 cm and 1.5 cm times the peak current measured in mega-amperes in the device and the cathode radius is between about 0.5 cm and about 3 cm times the peak current measured in mega-amperes in the device.

The insulator that separates the anode and the cathode may be made from a variety of materials depending on the particular application. For example, the insulator material may be made at least partially from quartz, pyrex glass, lava rock, ceramic, ceramic oxides and nitrides of aluminum, beryllium, boron, calcium, silicon, sodium and zirconium, boron carbide and combinations thereof. In addition, insulators may be machined, formed or shaped by conventional processes to the desired size, shape, thickness and profile. Other insulating material such as ceramic, ceramic oxides and nitrides made from aluminum, beryllium, boron, calcium, silicon and zirconium, e.g., Alumina ($Al_2O_3$), Silicon Nitride ($Si_3N_4$), Aluminum Nitride, Beryllium Oxide (BeO), Boron Carbide ($B_4C$), Zirconia ($ZrO_2$) and combinations thereof, may also be used. Selection of the insulator material will depend upon the size, and current range of the device.

The present invention includes a method for producing fusion energy from a fuel with an anode and an at least partially helical cathode in electrical communication with an electronic discharge source and converting the fusion energy into electrical energy. A plasma sheath with a magnetic field is formed through the discharge of an electrical current pulse across the anode and the at least partially helical cathode to form a plasmoid about the anode. One or more charged particles and x-rays are emitted from the plasmoid as a result of the decay of the magnetic field of the plasmoid. The charged particles heat the plasmoid, causing fusion reactions to take place and fusion energy to be released in the form of x-rays and charged particle beams.

The gas may be decaborane (B10H14) or pentaborane. Decaborane is a compound, which is an excellent source material because each decaborane molecule when vaporized and ionized can provide both boron and hydrogen ions in the correct proportion. However, other boron-containing compounds like borohydrides and boranes may be used e.g., borane, diborane, hexaborane, heptaborane, nonaborane, octaborane, triborane, and tetraborane.

The reaction chamber that houses the anode, cathode and gas is a vacuum chamber having connections for the anode and a cathode and other components of the electronic discharge source. In addition, the reaction chamber may have one or more connections to allow the induction and/or removal of one or more gases in to the reaction chamber. In some embodiments, the reaction chamber is positioned so that there is communication between the reaction chamber and a particle capturing device. The skilled artisan will recognize that the shape and dimensions of the particular reaction chamber will depend on the size of the electrodes, position of the electrodes, volume of the chamber and so forth.

The anode and cathode separated by an insulator and positioned coaxially at least partially within the reaction chamber. The present invention provides the cathode with a shape that imparts an angular momentum on a plasmoid by positioning the cathode at an angle to induce angular momentum. The relative angle is dependent on the specific design of the particular embodiment taking into account the amount of angular momentum to be added or removed.

The anode and cathode may individually be constructed from a variety of materials, e.g., beryllium, copper, etc., which allows the high x-ray emission to mainly pass through beryllium. Another material that may be used to construct the anode and/or the cathode is copper; however, the high x-ray emission will erode the copper anode quickly. In addition, the cathode and/or the anode may be made partially from metals (e.g., Aluminum, copper, aluminum, beryllium, chromium, copper, gold, nickel, molybdenum, palladium, platinum, silver, tantalum, titanium, tungsten and zinc) and alloys (e.g., copper-alloy, beryllium-alloy, copper-beryllium-alloy, Aluminum-alloy and other metal alloys). The cathode and/or the anode may also include a variety of dopants, e.g., beryllium, tungsten, molybdenum, rhenium, etc.

The method for converting fusion energy into electrical energy includes generating one or more particles made of one or more ion beams, one or more x-rays or combinations thereof. The particle capturing device is used to recover the one or more particles and includes an ion beam energy recovery circuit and an x-ray energy converter that may be incorporated into one device or separate devices depending on the needs of the particular application.

The x-ray energy converter includes one or more capacitors in electrical communication with one or more electron emitter layers and one or more electron collector layers. The one or more electron emitter layers adsorb the x-ray and emit electrons that are then adsorbed by the one or more electron collector layers. The x-ray energy converter may be a series of one or more x-ray energy converter positioned to collect x-rays of different energy levels. For example, the one or more x-ray energy converter may be one or more electron emitter layers and one or more electron collector layers nested concentrically to collect x-rays of different energy levels. Similarly, one or more electron collector layers may be a series of one or more electron collector layers positioned to absorb emissions of different energy and one or more electron emitter layers may be a series of one or more electron emitter layers. Generally, each of the one or more electron collector layers are separated by a voltage of between about 15 and about 25% relative to the next electron collector layer; however, the electron collector layers may be separated by a voltage of between about 10 and about 30% relative to the next electron collector layer depending on the particular application.

The method converting fusion energy into electrical energy includes a nested electrode design having a hollow cylinder anode centrally positioned among one or more cathodes positioned to impart angular momentum. The one or more helical cathodes are positioned at a helical angle with the angle depending on the particular application, but generally about 0.3 degrees, but may range between about 0.05 and about 10 degrees.

Another embodiment of the present invention used for producing one or more particles includes a magnetic field generated by a helical coil positioned about the anode and cathode. An initial axial magnetic field is generated by means of a helical coil, which in-turn imparts angular momentum. Additionally, the helical coil may be connected to a separate power source that is energized separately from the main power supply.

The anode has an anode radius and the cathode has a cathode radius that imparts a high magnetic field. The anode radius is between about 0.25 cm and 1.5 cm times the peak current measured in mega-amperes in the device and the cathode radius is between about 0.5 cm and about 3 cm times the peak current measured in mega-amperes in the device.

The insulator that separates the anode and the cathode may be made from a variety of materials depending on the particular application. For example, the insulator material may be made at least partially from quartz, pyrex glass, lava rock, ceramic, ceramic oxides and nitrides of aluminum, beryllium, boron, calcium, silicon, sodium and zirconium, boron carbide and combinations thereof. In addition, insulators may be machined, formed or shaped by conventional processes to the desired size, shape, thickness and profile. Other insulating material such as ceramic, ceramic oxides and nitrides made from aluminum, beryllium, boron, calcium, silicon and zirconium, e.g., Alumina ($Al_2O_3$), Silicon Nitride ($Si_3N_4$), Aluminum Nitride, Beryllium Oxide (BeO), Boron Carbide ($B_4C$), Zirconia ($ZrO_2$) and combinations thereof, may also be used. Selection of the insulator material will depend upon the size, and current range of the device.

The present invention also includes a generator for producing fusion energy and converting that energy into electrical energy that includes a reaction chamber, an electronic discharge system, energy conversion devices, switches and energy storage devices, and a cooling system. The reaction chamber includes a gas, an anode, a helical cathode positioned coaxially about the anode and may include a helical coil positioned about the cathode. The anode radius is between about 0.25 cm and 1.5 cm times the peak current measured in mega-amperes in the device and the cathode radius is between about 0.5 cm and about 3 cm times the peak current measured in mega-amperes in the device. The electronic discharge system is in electrical communication with the helical coil, the anode and the cathode and a power source. An initial axial magnetic field is generated by the helical coil to impart angular momentum and a plasmoid is created about the anode as a result of an electronic discharge to emit one or more particles from the gas. The fuel in the plasmoid generates fusion energy and releases it in the form of x-rays and ion beams. This energy is converted to electricity by an ion beam converter and x-ray converter and stored in electrical storage devices.

The present invention also includes an x-ray energy converter for directly converting x-ray emissions into electrical energy having one or more capacitors in electrical communication with one or more electron emitter layers and one or more electron collector layers. The one or more electron emitter layers adsorb the x-ray and emit electrons that are then adsorbed by the one or more electron collector layers. The x-ray energy converter may be a series of one or more x-ray energy converter positioned to collect x-rays of different energy levels. For example, the one or more x-ray energy converter may be one or more electron emitter layers and one or more electron collector layers nested concentrically to collect x-rays of different energy levels. Similarly, one or more electron collector layers may be a series of one or more electron collector layers positioned to absorb emissions of different energy and one or more electron emitter layers may be a series of one or more electron emitter layers. Generally, each of the one or more electron collector layers are separated by a voltage of between about 15 and about 25% relative to the next electron collector layer; however, the electron collector layers may be separated by a voltage of between about 10 and about 30% relative to the next electron collector layer depending on the particular application.

FIG. 1 is a side view of the plasma focus device 10 of the present invention. The plasma focus device 10 includes a nested electrode design having two electrodes nested inside each other. The outer electrode, the cathode 12, consists of a number of evenly space rods, while the inner electrode, the anode 14, is a hollow cylinder. An insulator 16 surrounds the base of the anode 14. The cathode 12 and the anode 14 are enclosed in a vacuum chamber (not shown) with a low-pressure gas filling the space between them. The anode 14 is connected to the cathode 12 through one or more capacitor banks 18 and one or more switches 20. For example, one embodiment of the plasma focus device 10 of the present invention includes two cylindrical beryllium electrodes nested inside each other. The cathode 12 and the anode 14 are enclosed in a vacuum chamber (not shown) with a low-pressure gas (e.g., decaborane) to supply the fuel for the reaction filling the space between them.

Figure 2:
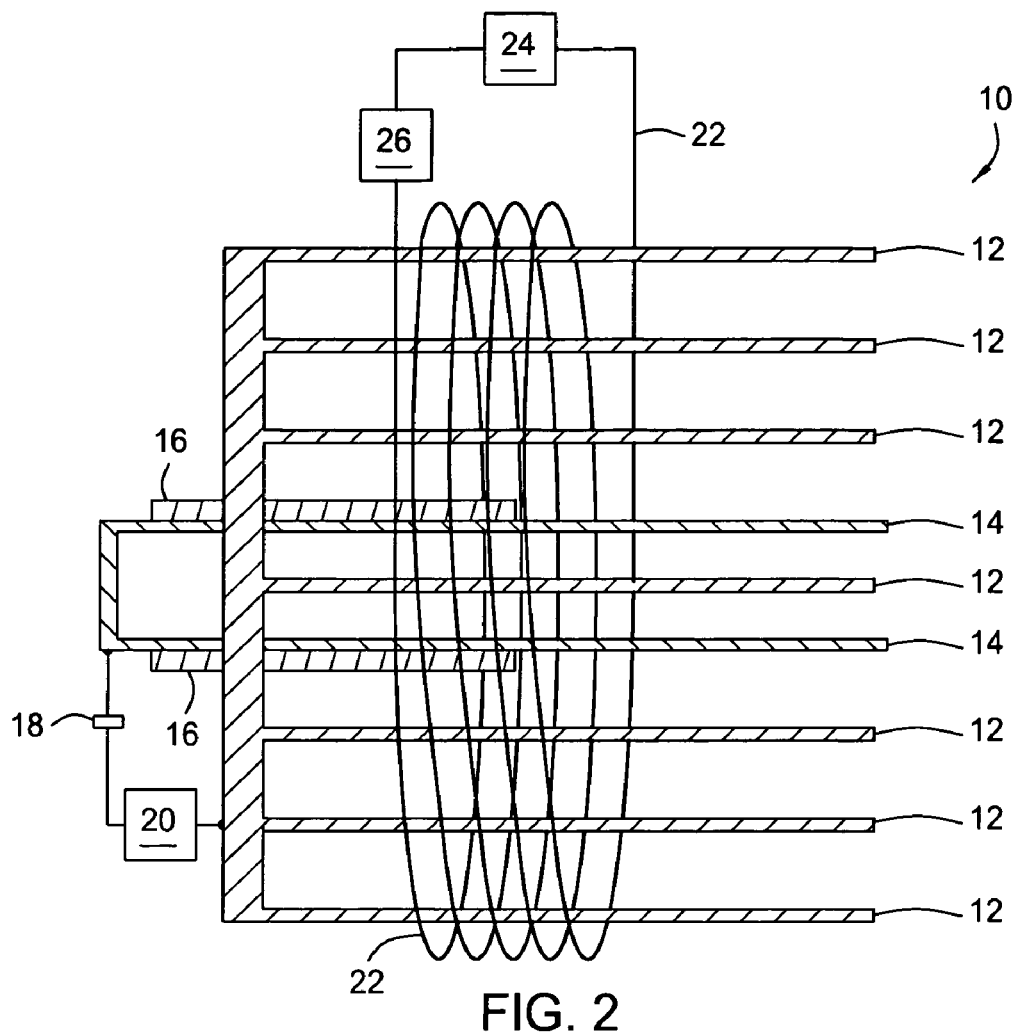
FIG. 2 is a side view of another embodiment of the present invention illustrating multiple electrodes of the plasma focus device that includes a helical coil.

FIG. 2 is a side view of another embodiment of the present invention illustrating multiple electrodes of the plasma focus device 10 that includes a helical coil. The plasma focus device 10 includes a nested electrode design having two electrodes nested inside each other. The outer electrodes, the cathodes 12, consist of a number of evenly space rods, while the inner electrode, the anode 14, is hollow cylinder. The number of cathodes will depend on the particular application, e,g, between about 2 and about 50. An insulator 16 surrounds the base of the anode 14. The cathodes 12 and the anode 14 are enclosed in a vacuum chamber (not shown) with a low-pressure gas filling the space between them. The anode 14 is connected to the cathodes 12 through one or more capacitor banks 18 and one or more switches 20. A helical coil 22 is positioned about the cathodes 12 and the anode 14 whereby the electrical energy produces a magnetic field that in-turn imparts angular momentum. The helical coil 22 is connected to a switch 26 and a power supply 24. The power supply 24 may be separated from the power supplied to the plasma focus device 10 allowing the helical coil 22 to be energized separately from the main power supply, alternatively the same source of power may be used for both. The position of the helical coil 22 and the number of revolutions around the cathodes 12 and the anode 14 will vary depending on the particular application.

Figure 3:
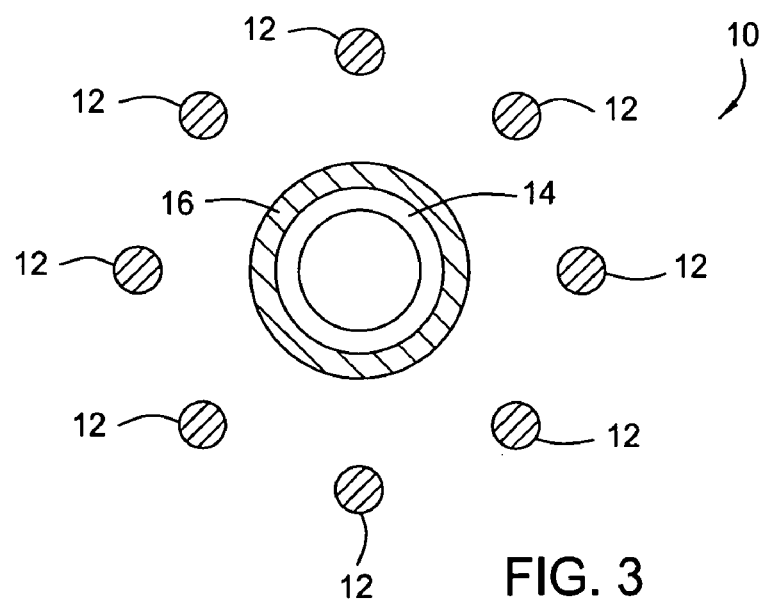
FIG. 3 is a top view of one embodiment of the present invention illustrating multiple electrodes of the plasma focus device.

FIG. 3 is a top view of one embodiment of the present invention illustrating multiple electrodes of the plasma focus device 10. The plasma focus device 10 includes a nested electrode design having two electrodes nested inside each other. The outer electrodes, the cathodes 12, consist of a number of evenly space rods, while the inner electrode, the anode 14, is hollow cylinder. The number of cathodes will depend on the particular application, e.g., between about 2 and about 50. An insulator 16 surrounds the base of the anode 14. The cathodes 12 and the anode 14 are enclosed in a vacuum chamber (not shown) with a low-pressure gas filling the space between them. The anode 14 is connected to the cathodes 12 through one or more capacitor banks (not shown) and one or more switches (not shown).

Figure 4:
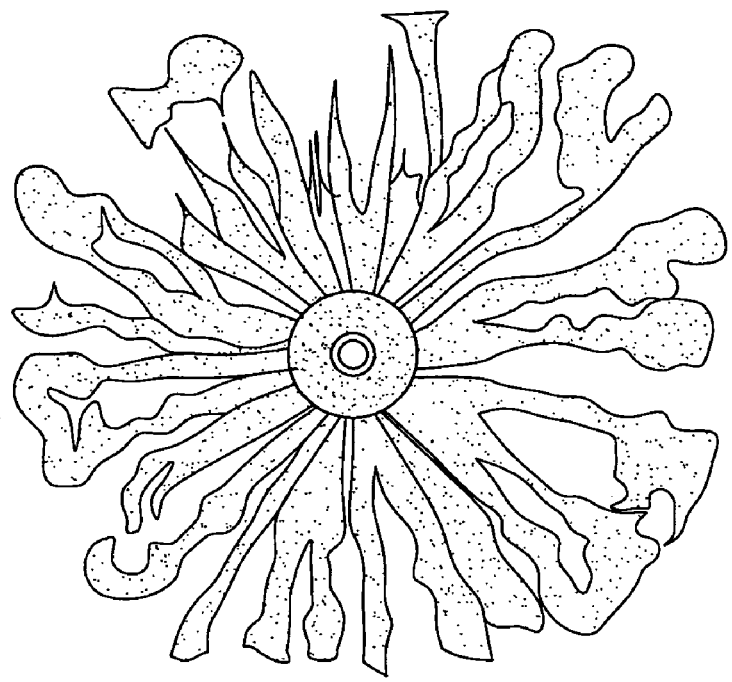
FIG. 4 is an image of the current formed into the thin sheath of plasma filaments under the influence of the magnetic field.

FIG. 4 is an image of the current formed into the thin sheath of plasma filament under the influence of the magnetic field. As the current moves the thin sheath of plasma filaments are formed and can be seen in FIG. 1. In operation, a pulse of electricity from a capacitor bank is discharged across the electrodes. For about a few millionths of a second, an intense current flows from the outer to the inner electrode through the gas and the current starts to heat the gas and creates an intense magnetic field. Guided by its own magnetic field, the current forms itself into a thin sheath of plasma filaments.

Figure 5:
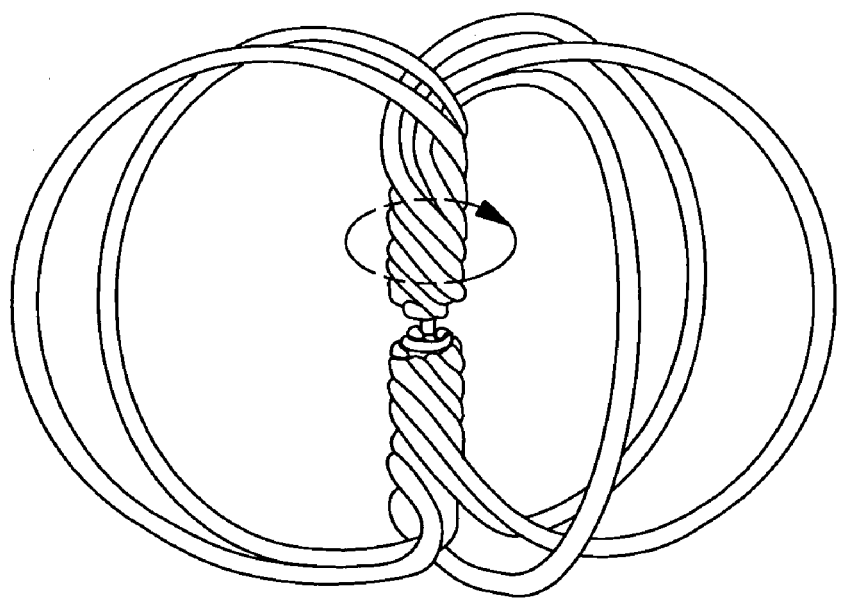
FIG. 5 is an illustration of the current formed into the plasmoid.

FIG. 5 is an illustration of the plasmoid formed using the present invention. The thin sheath of plasma filaments travel to the end of the anode where the magnetic fields produced by the currents pinch and twist the plasma into a tiny, dense ball only a few microns across called a plasmoid. As the magnetic field energy in the plasmoid begin to decrease, the changing magnetic fields induce an electric field, which causes a beam of electrons to flow in one direction and a beam of ions in the other. The electron beam heats the electrons in the plasmoid and the electrons in turn heat the ions of the reactor fuel, e.g., hydrogen and boron, which produce fusion reactions. Energy is emitted from the plasmoid in the form of an intense, focused ions beam and a burst of x-rays. The plasmoid exists for a few to tens of nanoseconds.

Figure 6:
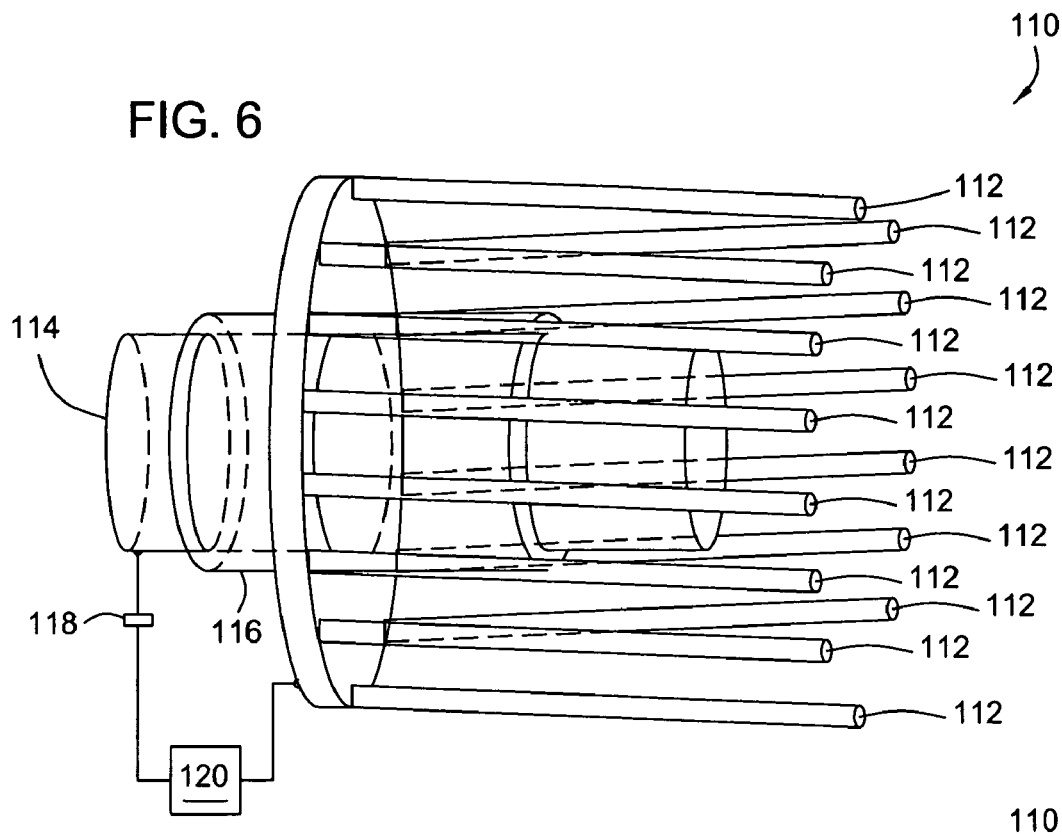
FIG. 6 is a perspective view of another embodiment of the present invention illustrating multiple helical cathodes.

FIG. 6 is a perspective view of another embodiment of the present invention illustrating multiple electrodes of the plasma focus device 110 in which the helical cathodes are tilted. The plasma focus device 110 includes a nested electrode design having two electrodes nested inside each other. The outer helical electrodes, the helical cathodes 112 consist of a number of evenly space rods, while the inner electrode, the anode 114, is hollow cylinder. An insulator 116 surrounds the base of the anode 114. The helical cathodes 112 are tilted to impart angular momentum. The degree of tilt will depend on the particular application. For example, one embodiment has a tilt of 0.3 degrees; however, the range of tilt may be from about 0.05 degree to about 10 degrees. The helical cathodes 112 and the anode 114 are enclosed in a vacuum chamber (not shown) with a low-pressure gas filling the space between them. The anode 114 is connected to the helical cathodes 112 through one or more capacitor banks 118 and one or more switches 120. For example, one embodiment of the plasma focus device 110 of the present invention includes two cylindrical beryllium electrodes nested inside each other. The helical cathodes 112 and the anode 114 are enclosed in a vacuum chamber (not shown) with a low-pressure gas (e.g., decaborane) to supply the fuel for the reaction filling the space between them.

Figure 7:
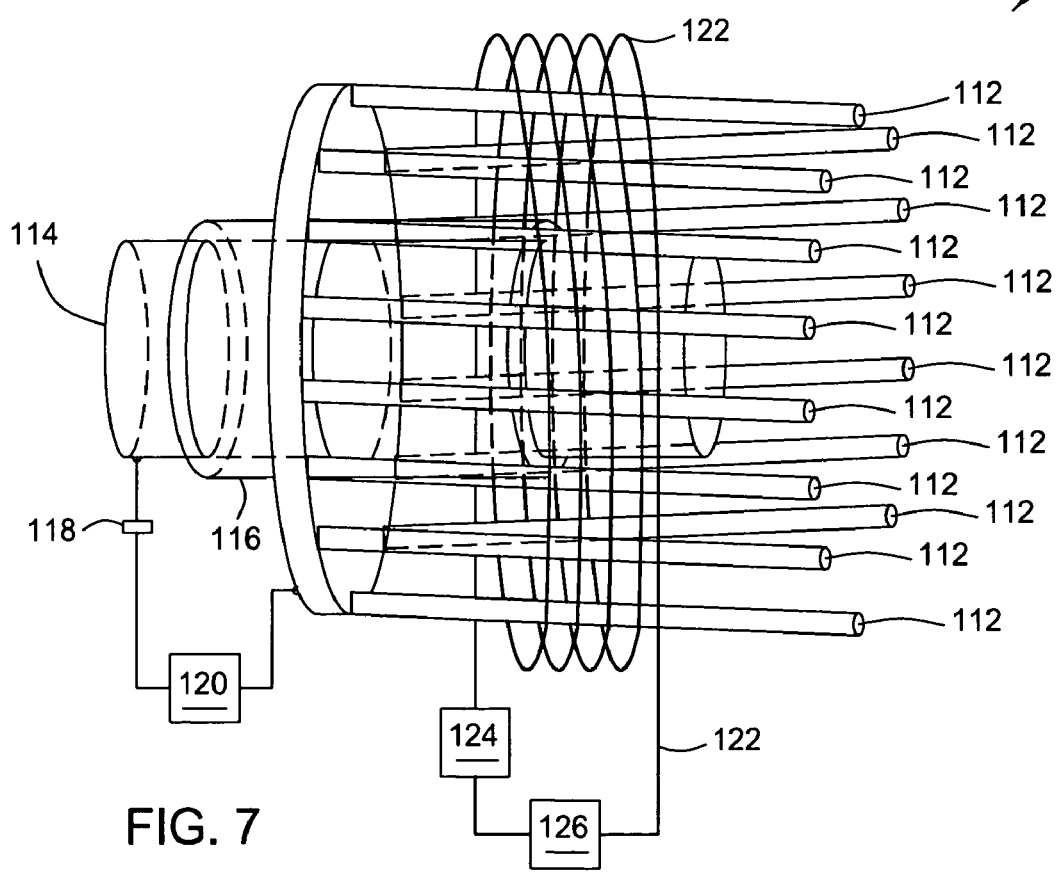
FIG. 7 is a perspective view of another embodiment of the present invention illustrating multiple helical electrodes of the plasma focus device that includes a helical coil.

FIG. 7 is a perspective view of another embodiment of the present invention illustrating multiple electrodes of the plasma focus device 110 that includes a helical coil. The plasma focus device 110 includes a nested electrode design having two electrodes nested inside each other. The outer electrodes, one or more helical cathodes 112, consist of a number of evenly space rods, while the inner electrode, the anode 114, is hollow cylinder. The one or more helical cathodes 112 are positioned at a helical angle or tilted to impart angular momentum. The degree of tilt will depend on the particular application. For example, one embodiment has a tilt of 0.3 degrees; however, the range of tilt may be from about 0.05 degree to about 10 degrees. The number of one or more helical cathodes 112 will depend on the particular application, e.g., between about 2 and about 50. An insulator 116 surrounds the base of the anode 114. The one or more helical cathodes 112 and the anode 114 are enclosed in a vacuum chamber (not shown) with a low-pressure gas filling the space between them. The anode 114 is connected to the one or more helical cathodes 112 through one or more capacitor banks 118 and one or more switches 120. A helical coil 122 is positioned about the electrodes whereby the electrical energy produces a magnetic field that in-turn imparts angular momentum. The helical coil 122 is connected to a switch 126 and a power supply 124. The power supply 124 may be separated from the power supplied to the plasma focus device 110 allowing the helical coil 122 to be energized separately from the main power supply, alternatively the same source of power may be used for both.

Figure 8:
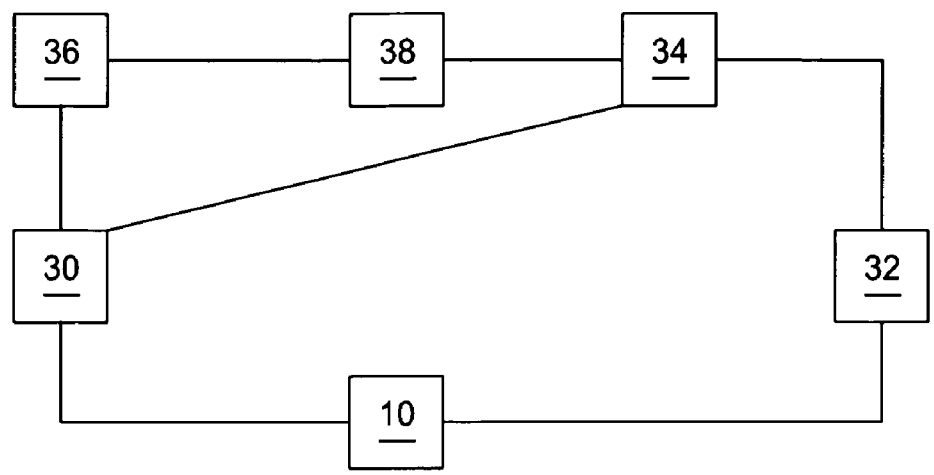
FIG. 8 is a schematic of the energy recovery system.

FIG. 8 is a schematic of the energy recovery system. The plasma focus device 10 of the present invention is connected to a first switch 30 and a second switch 32. Both the first switch 30 and the second switch 32 are connected to a main capacitor bank 34. The main capacitor bank 34 may contain one or more capacitors arranged in banks or may contain one or more capacitors arranged multiple banks, which are in turn arranged in banks of capacitors. The first switch 30 is also connected to a second capacitor bank 36.

Figure 9:
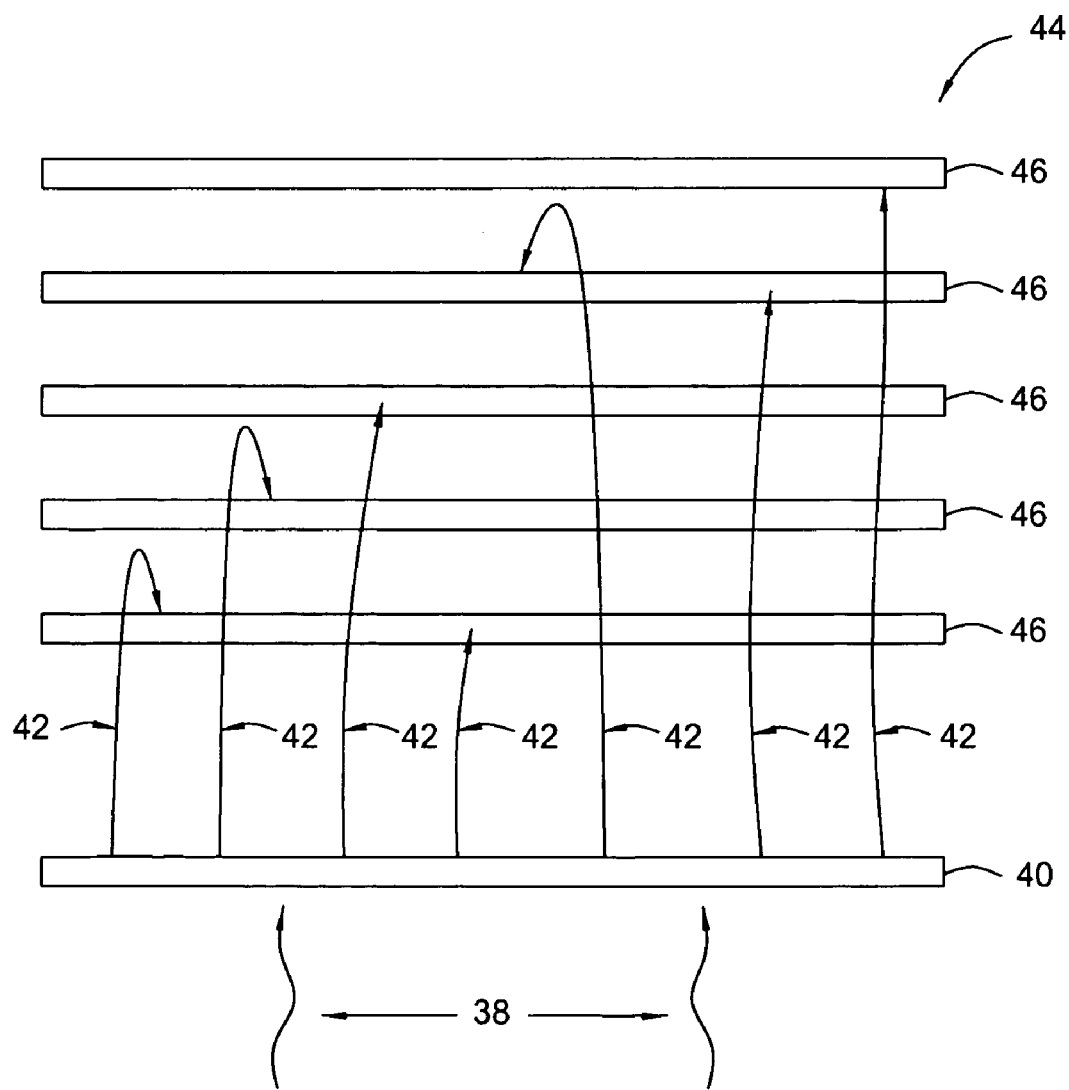
FIG. 9 is a schematic of the energy conversion of x-rays.

FIG. 9 is a schematic of the energy conversion of x-rays. The x-ray pulse 38 can be converted at high efficiency to electricity via the photoelectric effect. The converter is essentially a capacitor with multiple layers of thin metal films. One type of film, type A film 40 serves as the emitter of one or more electrons 42, converting the energy from the x-ray 38 to that of multi-keV electrons 42. The type A film 40 also serve as the ground electrodes of the capacitor. A second type of film, type B film 44, serves to collect the emitted electrons 42 and act as the cathode electrodes 46 of the capacitor. In a single layer, x-rays 38 impinge on metal type A film 40, causing the emission of electrons 42 with a range of energies. These electrons 42 travel through a series of very thin type B film 44, which are initially charged to an ascending series of voltages by an external circuit. When the electrons 42 approach an electrode 46 charged to a greater voltage V than their energy in electron volts, they turn back and are absorbed by the next lower electrode 46.

For high efficiency in converting the energy of the x-rays 38 into the energy of the electrons 42, the converter design must ensure that nearly all the x-rays 38 are absorbed in type A film 40 and that very little of the electrons energy is absorbed before leaving type A film 40. In addition, x-ray absorbance in thin type B film 44 must be minimized by suitable choice of material.

Figure 10:
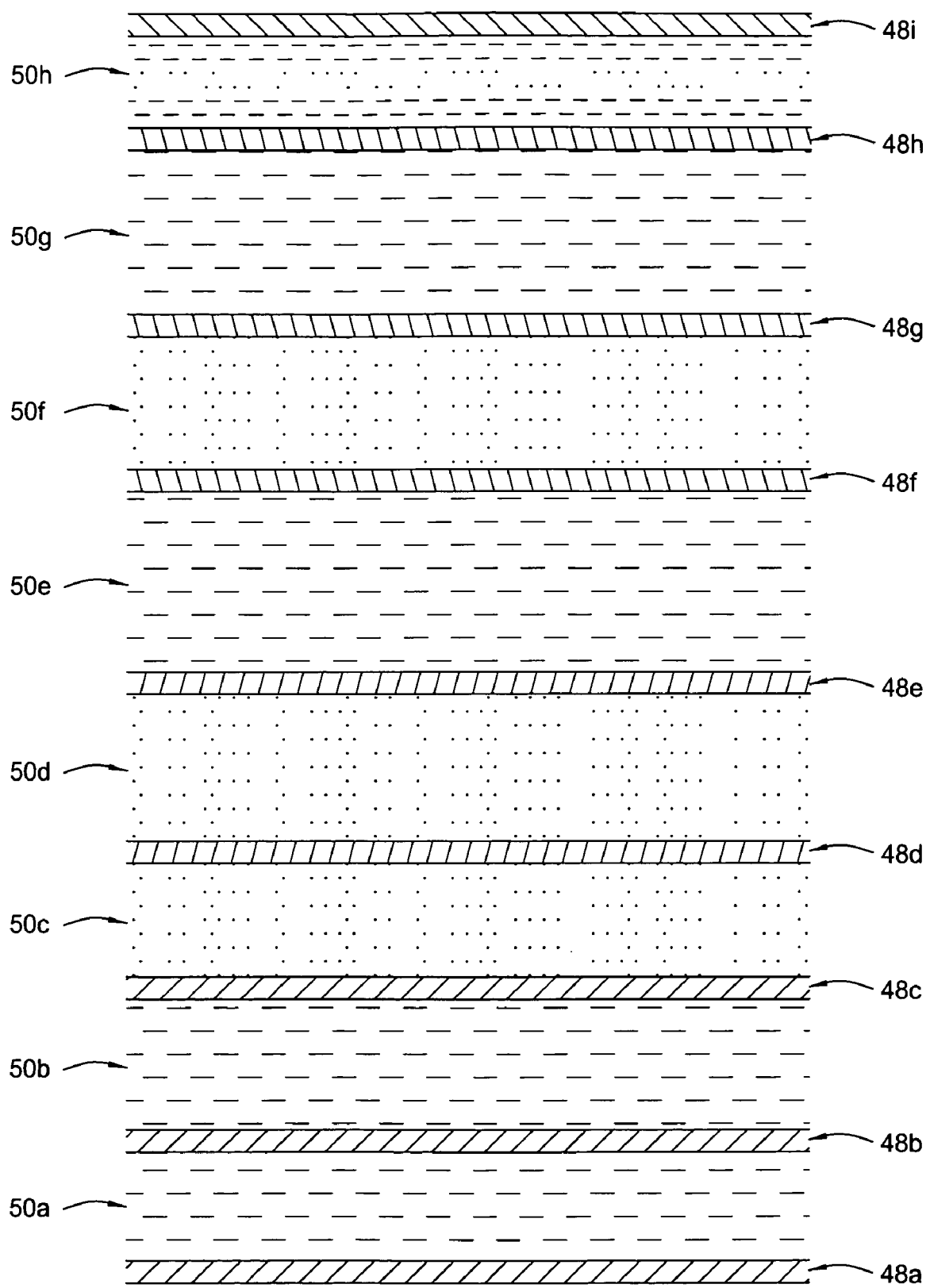
FIG. 10 is a schematic of the overall x-ray collector.

FIG. 10 is a schematic of the overall x-ray collector. The x-ray collector 46 includes one or more metal layers 48a-48i separated by interstitial layers 50a-50h. The composition of the one or more metal layers 48a-48i may vary depending on the specific embodiment. For example, metal layers 48a, 48b and 48c contain aluminum, metal layers 48d and 48e contain copper, while metal layers 48e, 48f and 48g contain tungsten. Similarly, the composition of the interstitial layers 50a-50h may vary depending on the specific embodiment. For example, interstitial layers 50a, 50b and 50c may be aluminum or beryllium, while 50g is tungsten. Although the skilled artisan will recognize the above examples are intended for illustrative purposes and that other metals may be used and in different orders and compositions.

Figure 11:
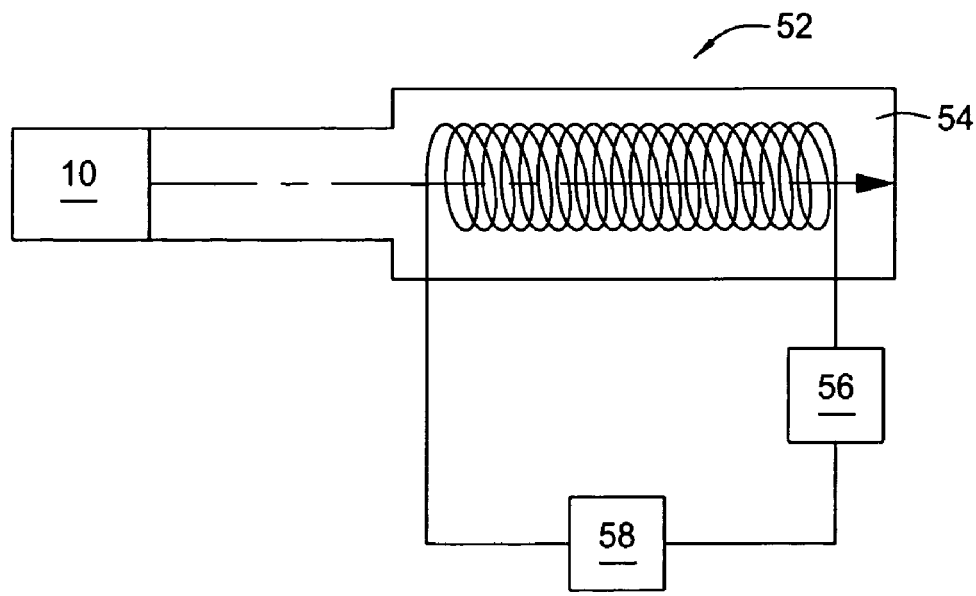
FIG. 11 is a schematic of the ion beam collector.

FIG. 11 is a schematic of the ion beam collector. The ion beam collector 52 is in communication with a gyrotron 54 to couple the ion beam efficiently to a RF pulse. In another embodiment, the ion beam collector 52 is in communication with a peniotron converter (not shown). A series of fast switches 56 activated by UV light, can be used to couple the RF pulse into fast storage capacitors, with the switch 56 opening when the capacitors 58 are charged, preventing energy from flowing back into the resonator. The ion beam spreads in flight, but still has a short pulse length when it arrives at the gyrotron 54 creating a rapidly varying magnetic field; make it easier to optimize an efficient design to couple the energy into a circuit. The high power of the ion beam collector 52 requires careful design of the circuit to link the transfer the power into capacitors 58 at reasonable potentials. The basic considerations are clear to one skilled in the art.

Figure 12:
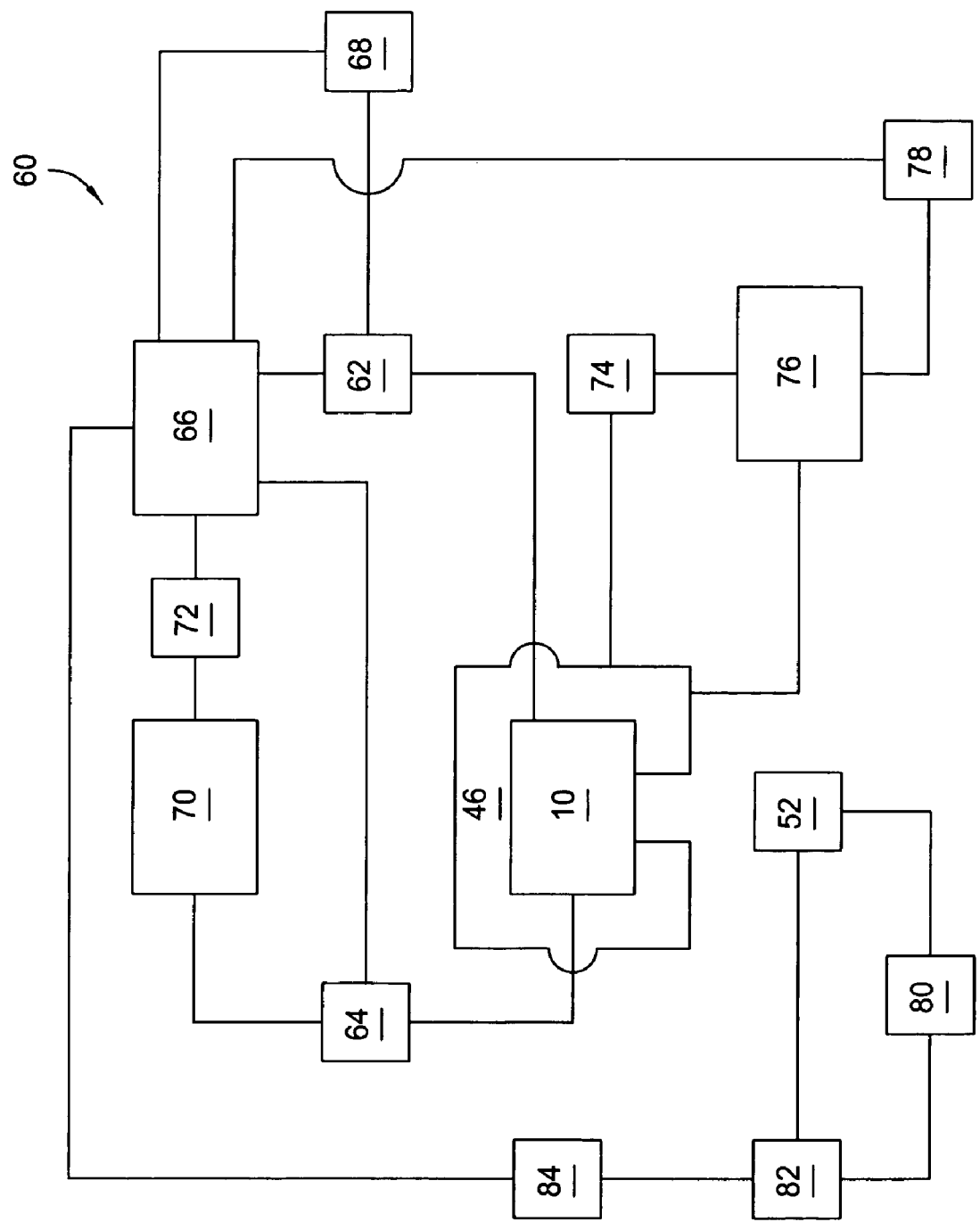
FIG. 12 is a schematic of the overall circuit of the plasma focus device.

FIG. 12 is a schematic of the overall circuit of the plasma focus device. The overall circuit 60 includes a plasma focus device 10 in communication with x-ray collector 46 and ion beam collector 52. The plasma focus device 10 is connected to a first switch 62 and a second switch 64. The first switch 62 is connected to a main capacitor bank 66 and to a grid 68. The second switch 64 is connected to the main capacitor bank 66 and a secondary capacitor bank 70. The main capacitor bank 66 and the secondary capacitor bank 70 are connected by capacitor switch 72. The x-ray collector 46 is connected to an x-ray collector switch 74 that is connected to a secondary x-ray collector capacitor 76. The secondary x-ray collector capacitor 76 is connected to the x-ray collector 46 and an x-ray collector switch 78 that is in turn connected to the main capacitor bank 66. The ion beam collector 52 is connected to an ion beam collector switch 80 and an ion beam capacitor bank 82. The ion beam collector switch 80 is also connected to the ion beam capacitor bank 82. The ion beam capacitor bank 82 is connected to a second ion beam collector switch 84 that is then connected to the main capacitor bank 66. The skilled artisan will recognize that there are many different configurations of the present invention and the present figure is but one of many contemplated by the inventors.

Figure 13:
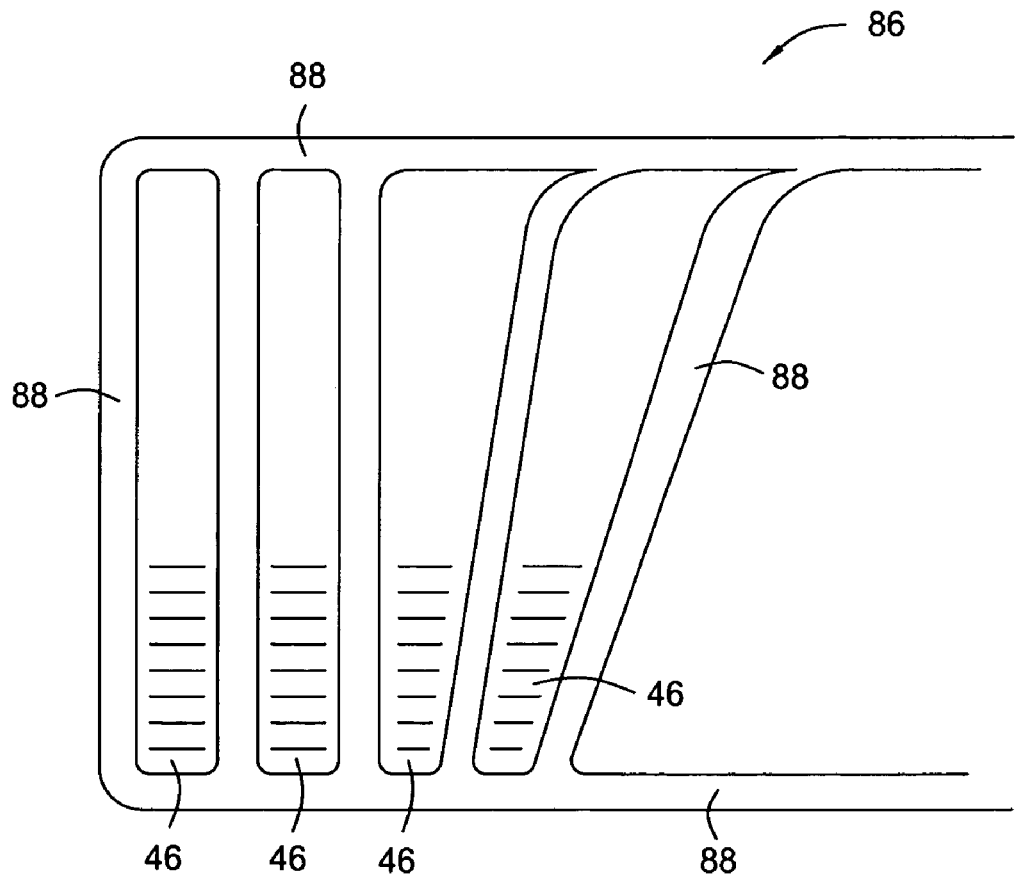
FIG. 13 is a diagram of the coolant system of the x-ray collector.

FIG. 13 is a diagram of the coolant system of the x-ray collector. Since the ion beam energy conversion system has a large surface area and the residual heat is distributed within it, cooling it is relatively simple. In the case of the x-ray conversion system 86, however, care must be taken to avoid blocking the x-rays or electrons with the coolant itself by passing an electrically non-conducting coolant, e.g., silicone, through several dozen very narrow pair of conduits 86, all oriented radially toward the plasmoid. The x-ray collector 46 is made up of one or more metal layers (not shown) and interstitial layers (not shown) are separated by conduits 86. If the coolant plates have a typical separation of a few tens of microns, they absorb less than about 1% of the radiation, but are still able to carry adequate coolant flow to remove about 2 MW of waste heat from the x-ray conversion device. The coolant plates, running radially through the device every several degrees can also serve to give mechanical support to the thin film electrodes.

The reactor fuel may be a hydrogen-boron source. Some examples of hydrogen-boron fuels (pB11) are borane compounds, e.g., decaborane. Hydrogen-boron fusion (p+11B) is a desirable fuel for fusion, as it releases 8.7 MeV as the kinetic energy of alpha particles (4He). Hydrogen-boron fusion uses only stable isotopes and produces only charged particles. A fusion reactor can easily convert the charged-particle energy end products into electricity, with about 80% efficiency.

Description of high magnetic field effect. The higher atomic change, Z, of B11 greatly increases the x-ray emission rate, which is proportional to $Z^2$ making it difficult to achieve ignition, e.g., the point at which the thermonuclear power exceeds the x-ray emission. The present invention overcomes these difficulties using a detailed quantitative theory of the plasma focus, described below, and the high magnetic field effect (HMFE). This effect, first pointed out by McNally, involves the reduction of energy transfer from the ions to the electrons in the presence of a strong magnetic field. This in turn reduces the electron temperature and thus the bremsstrahlung emission.

For ions colliding with electrons with gyrofrequency $\omega_g$, energy transfer drops rapidly for impact parameters $$b > \frac{v_i}{\omega_g},$$

where $v_i$ is ion velocity, since in that case the electron is accelerated at some times during the collision and decelerated at others, so average energy transfer is small. This means that the $b_{max}$ is less than the Debye length, $\lambda_D$ by a factor of $$\frac{v_i \omega_p}{v_{et} \omega_g},$$

where $\omega_p$ is the plasma frequency and $v_{et}$ is the electron thermal velocity. So the Coulomb logarithm in the standard energy-loss formula is reduced to $$\operatorname{Ln}\left(\frac{mv_i^2}{\hbar \omega_g}\right).$$

The formula is approximately valid for collisions in which ions collide with slower moving electrons, which are the only collisions in which the ions lose energy. But for collisions of faster moving electrons with ions, where the electrons lose energy to the ions, the Coulomb logarithm, by the same logic, is Ln $$\left(\frac{mv_{et}^2}{\hbar \omega_g}\right).$$

If $v_{et} \gg v_i$ then Ln $$\left(\frac{mv_e^2}{\hbar \omega_g}\right)$$

can be much larger than Ln $$\left(\frac{mv_i^2}{\hbar \omega_g}\right)$$

for sufficiently large values of $$\hbar \omega_g,$$

in other words for sufficiently large B. Ignoring momentum transfer parallel to field, steady state occurs when $$\frac{Ti}{Te} = \operatorname{Ln}\left(\frac{mv_e^2}{\hbar \omega_g}\right) \bigg/ \operatorname{Ln}\left(\frac{mv_i^2}{\hbar \omega_g}\right) [2].$$

This effect has been studied in a few cases for fusion plasmas with relatively weak fields, where it is shown to have a relatively small effect, e.g., see J. Galambos and G. H. Miley. It has been studied much more extensively in the case of neutron stars, e.g., G. S. Miller, E. E. Salpeter, and I. Wasserman. However, until the present research, it has not been applied to the dense plasma focus (DPF) plasmoids, whose force-free configuration and very strong magnetic fields make the effect far more important, eg., Lerner, "Prospects for P11B Fusion with the Dense Plasma Focus: New Results."

The dense plasma focus device produces hot-spots or plasmoids, which a micron-sized magnetically self contained configurations with life times of nanoseconds to tens of nanoseconds. It is within these plasmoids that the plasma is heated to high energy and fusion reactions take place. Such plasmoids have been observed to have magnetic field as high as 400 MG and density in excess of $10^{21}$/cc.

To apply the magnetic effect to the DPF plasmoids, which are force-free configurations, the small-angle momentum transfer parallel to the field can be neglected in these plasmoids, since the ion velocity lies very close to the local magnetic field direction and $$\frac{\Delta \rho_{par}}{\Delta \rho_{perp}} \sim \sin^2 \theta,$$

where $\theta$ is the angle between the ion velocity and the B field direction.

In a force-free configuration, such as the toroidal vortices that make up the plasmoids, ions disturbed by collisions return to the local field lines in times of order $$\frac{1}{\omega_{gi}}, \text{ so } \theta \sim \frac{\omega_{ci}}{\omega_{gi}}.$$

Where $\omega_{ci}$ is the ion collision frequency. For a decaborane plasma, $$\theta \sim \frac{2 \times 10^{-8} n}{T_i^{3/2} B}.$$

The example of the plasmoid conditions obtained in $n_i = 3 \times 10^{21}$, B=400 MG, $\theta=0.01$ for $T_i=60$ keV. For an example near break-even conditions, $n_i=1.4 \times 10^{24}$, B=16 GG, $\theta=0.004$ for $T_i=600$ keV. Small-angle parallel momentum transfer is significant only for combinations of very high $n_i$ and $T_i < 60$ keV, which generally do not occur except during very brief early phases of the heating and compression of dense plasmoids. The high B in plasmoids generate a regime where $$\frac{mv_i^2}{\hbar \omega_g} < 1.$$

In this case, the magnetic effect is very large, the above formulae break down and quantum effects have to be considered. Such a situation has not been studied before for fusion applications, but has been analyzed extensively in the case of protons falling onto neutron stars.

In a strong magnetic field, since angular momentum is quantized in units of h, electrons can have only discrete energy levels, termed Landau levels (e.g., ignoring motion parallel to the magnetic field):

$$E_b = \frac{\left(n+\frac{1}{2}\right) e\hbar B}{mc} = \left(n+\frac{1}{2}\right) 11.6 eVB(GG).$$

Viewed another way, electrons cannot have gyroradii smaller than their DeBroglie wavelength. Since maximum momentum transfer is mv, where v is relative velocity, for $$\frac{mv^2}{2} < E_b$$

almost no excitation of electrons to the next Landau level can occur, so very little energy can be transferred to the electrons in such collisions. Again ignoring the electron's own motion along the field lines, thus condition occurs when $$E_i < \left(\frac{M}{m}\right) E_b$$

For $E_i=300$ keV, this implies B>14 GG for p, B>3.5 GG for $\alpha$, and B>1.3 GG for $^{11}$B. As will be shown below, such field strengths are attainable with the DPF.

If $T_{eth} >> E_b$, then we have to consider the motion of the electrons along the field lines, which can increase the relative velocity of collision, v. In the classical case, the ions will lose energy only from electrons for which $v_{epar} < v_i$. Since for these collisions $v < 2v_i$, energy loss will still be very small if $E_i < \frac{1}{2}$ (M/m)$E_b$, which can occur for boron nuclei.

However, there is a phenomenon, which prevents energy loss to the electrons from falling to negligible levels. In the classical case, considering only motion along the line of force, an ion colliding with a faster moving electron will lose energy if the electrons' velocity is opposite to the of the ion, but will gain energy if they are in the same direction, e.g., the electron overtaking the ion. In the latter case, the relative velocity is less than in the former case, and since the energy transfer increases with decreasing relative velocity, there is a net gain of energy to the ion. For an ion moving faster than the electron, the ion overtakes the electrons and thus loses energy independently of the direction that the electron is moving. Thus, the ions only lose energy to electrons moving more slowly than they are.

However, ions in some cases can lose energy to electrons that are moving faster than the ions. Consider the case of ions moving along the field lines colliding with electrons in the ground Landau level. If $v_{epar}$ is such that $m(v_i+v_{epar})^2 > 2E_b$, while $m(v_i-v_{epar})^2 < 2E_b$, the energy lost by the ion in collision with opposite-directed electrons will much exceed that gained in same-directed collisions, since in the first case the electron can be excited to a higher Landau level, but not in the second case. In neither case can the electron give up to the ion energy from perpendicular motion, as it is in the ground state. So, this consideration does not apply to above-ground-state electrons, which will lose energy to slower-moving ions.

If $T_{eth} >> E_b$, and a Maxwellian distribution is assumed, the number of electrons in the ground state will be proportional to the volume in velocity-space. The number of such electrons in the ground state will be $\sim \pi v_i E_b$, while the number of electrons moving slower than $v_i$ in a non-magnetic Maxwellian distribution will be $\sim (8/3) \pi v_i E_i (m/M)$, so there will be a factor of $(\frac{3}{8}) E_i / E_i$ (m/M) increasing the effective collision rate, comparing the magnetic with non-magnetic case, for $E_i < E_b$.

At the same time, the rate of energy loss to each electron will be much less at relative velocities of order $$v_b = \left(\frac{2E_b}{m}\right)^{1/2},$$

as compared to relative velocities of order $v_i$ in the non-magnetic case. This reduces the energy loss for the magnetic case by a factor of $$E_i \left(\frac{m}{M}\right) / E_b.$$

Combining these two factors, it is clear that the Coulomb logarithm term in the magnetic case tends to a constant value, independent of $E_i$ for $E_i < E_b$.

The calculation of the exact value of $\ln \Lambda$ for a given Maxwellian distribution of ions with dimensionless temperature $T = T_i / E_b (M/m)$, begins with a quantum mechanical calculation of $\ln \Lambda'$ for an ion moving along the field line colliding with an electron assumed to be at rest. This result was calculated by Nelson, Saltpeter and Wasserman.

$$\ln \Lambda'(v) = \left(\frac{1}{2}\right) v \left(\frac{1}{2v^2}\right) - \exp(2v^2)\Gamma(0, 2v^2)$$

Where $v$ is the dimensionless ion velocity $v_i/v_b$, and $v<1$. For $v>1$, the same source gives as a good approximation:

$$\ln \Lambda'(v) = \ln(2v^2)$$

To determine the effective $\ln\Lambda''(v)$ for an ion of velocity $v$ colliding with ground state electrons with temperature $T_{eth} \gg E_b$, we can use these formulae, substituting in $v'$ as the relative velocity. First consider the case where $v<1$ and $v'<1$. There are equal number of electrons moving with positive or negative velocity relative to $v$, so we integrate assuming both $v'=v+v_e$ and $v'=v-v_e$, where $v_e$ is $v_e/v_b$. For $v>v_e$, both cases contribute to ion energy loss, while for $v<v_e$, the $v+v_e$ case adds to ion energy loss, while the $v-v_e$ cases subtracts. Taking into account the $1/v^2$ dependence of energy loss rates, the contribution to $\ln\Lambda''(v)$ from $v'<1$ collisions is:

$$\frac{3}{8} v^{-1} \left( \int_0^v v^{-2} \right) \ln \Lambda'(v - v_e) dv_e + \int_0^{1-v} v^{-2} \ln \Lambda'(v + v_e) dv_e$$

Numerical integration shows that this integral is 0 for all $v'<1$. While individual collisions can add or subtract energy, collectively there is no net energy transfer when the relative velocity is too low to excite the electron out of the ground state, as would be naively expected. This leaves the cases where $v'>1$. If $v+v_e>1+2v$, then $v_e-v>1$ as well, and in these cases since $v_e>v$ (still considering $v<1$) the ions gain energy on net. So additional energy loss can only come when $1<v+v_e<1+2v$. So the additional term (which contributes the whole of $\ln\Lambda''(v)$) is $$\ln \Lambda''(v) = \frac{3}{8} v^{-1} \int_1^{1+2v} \ln(2v'^2) v'^2 dv'$$

$$= \frac{3}{8} v^{-1} ((2 + \ln 2/2)(1 - 1/1 + 2v) - \ln(1 + 2v)/(1 + 2v))$$

This expression is close to $3/8$ for $0.2<v<0.5$ and decreases to $3/8 \ln 2$ as $v$ approaches 0 and to $\sim(3/8)\times 0.83$ for $v=1$. For $v>1$, another term is needed to account for the case where $v>v_e$ and $v_e-v>1$, where energy is again lost to the electrons. In addition, for $v>(3/2)^{1/2}$, energy can be lost to non-ground-state electrons as well, and $\ln\Lambda''(v)$ rapidly converges on $((v-1)/v)\ln(2v^2)$. We can use this value for $v>1.35$.

Finally, integration over a Maxwellian distribution of $v$ yields the effective Coulomb logarithm as a function of T, the dimensionless ion temperature. As a first approximation, the use of Maxwellian distributions is justified by the fact that the ion-ion and electron-electron energy transfer rates considerably exceed the ion-electron rates. However, the ion velocity distribution will be distorted by the alpha-particle heating.

$$\ln \Lambda(T) = \frac{3}{8} \int_0^{1.35} \left( \exp\left(-\frac{v^2}{T}\right) \right) / v^2 \bigg) ((2 + \ln 2/2)(1 - 1/1 + 2v) - $$
$$\ln(1 + 2v)/1 + 2v) dv +$$

-continued $$\frac{3}{8} \int_1^{1.35} \left( \exp\left(-\frac{v^2}{T}\right) \right) v^3 \bigg) ((2 + \ln 2/2)(v - 1) - 2 \ln v) dv +$$

$$\int_{1.35}^{\infty} \left( \exp\left(-\frac{v^2}{T}\right) \right) v \bigg) ((v - 1)/v) \ln(2v^2) dv$$

This result is presented in Table 1.

| T | lnΛ(T) |
|---|---|
| 0.05 | 0.346 |
| 0.1 | 0.353 |
| 0.2 | 0.354 |
| 0.3 | 0.350 |
| 0.4 | 0.349 |
| 0.5 | 0.350 |
| 0.6 | 0.353 |
| 0.8 | 0.368 |
| 1.0 | 0.392 |
| 2.0 | 0.567 |
| 3.0 | 0.755 |
| 4.0 | 0.926 |
| 6.0 | 1.218 |

For the heating of the ions by the much faster thermal electrons, with $Te \gg 1$, quantum effects can be ignored and the coulomb logarithm is simply $\ln(2Te)$.

Operating parameters of dense plasma focus (DPF) with high magnetic field effect (HMFE). In order to apply the scientific phenomena of the HMFE to the DPF as a functioning invention, the correct plasma parameters of the plasmoid must be determined so as to ensure the production of sufficient thermonuclear power for practical energy generation. This can be done by a model of the plasmoid that correctly describes the physical evolution over its lifetime.

As described in Lerner, E. J. Laser and Particle Beams, Lerner, E. J., Peratt, A. L., the DPF process can be described quantitatively using only a few basic assumptions. First, the magnetic energy of the field is conserved during the formation of the plasmoid and that in a well-formed pinch, all the energy present in the field at the time of the pinch is trapped in the plasmoid. Given that experimentally, it has been determined that the length of the central channel in the plasmoid is close to 8 times its radius:

$$I_c^2 r_c = I^2 r/8$$

where $I_c$ is current (A) in the plasmoid, $r_c$ is the radius (cm) of the central plasmoid channel, I is current at time of pinch and r is the cathode radius.

Second, following, plasma instability theory shows that for optimal filament formation, in the plasma chamber, $$\omega_{ce} = \omega_{pi}$$

where $\omega_{ce}$ is electron gyrofrequency and $\omega_{pi}$ is ion plasma frequency. This immediately allows us to predict the optimal pressures given r and I, the plasma velocity, and thus the electrode length for a given pulse length.

$$n_i = (\mu M/m) I^2 / 100 \pi m c^2 r^2$$

$$V = c(m/\mu M)(r/R),$$

where $n_i$ is initial ion density, $\mu$ is atomic mass, V is the peak sheath velocity at the anode, R is the anode radius, m is electron mass and M is proton mass.

Third, instability theory can also be used to show that in the filaments $$\omega_{cef} = \omega_{pep}$$

Where $\omega_{cef}$ is the electron gyrofrequency in the filament and $\omega_{pep}$ is the electron plasma frequency in the background plasma. The incoming filament system, and thus the DPF as a whole has an effective resistance of:

$$15/(\mu M/m)^{3/4} \text{ ohms}$$

So that the peak I for a given V can be determined. It should be noted that this is a maximum value, and that it can only be obtained if the inductance of the pulsed power supply plus DPF is sufficiently low.

Fourth, we know that at the time the plasmoid begins to decay:

$$\omega_{ce} = 2\omega_{pe}.$$

This is due to the condition that when the synchrotron frequency exceeds twice the plasma frequency, energy can be radiated. At this point, the current begins to drop, and the change in the magnetic field sets up large accelerating potentials to sustain the current. This in turn generates the ion and electron beams that release the energy trapped in the plasmoid and initiate its decay, as well as start nuclear reactions.

Finally, we assume that during compression the ratio B/n is a constant. From these basic physical relations, the plasma parameters in the plasmoid, not only for hydrogen, but for any gas or mixture of gases can be derived. The results are summarized here:

$$r_c = 2^{-7/3} \mu^{-2/3} z^{-2/3} M/m^{-2/3} r = 1.32 \times 10^{-3} \mu^{-2/3} z^{-2/3} r$$

$$B_c = 4z(\mu M/m)B$$

$$n_c = 3.7 \times 10^{10} \mu^2 z I^2 / r^2$$

Where $B_c$ is peak field at cathode. The model also allows us to describe the production of the electron and ion beams and the duration of the plasmoid. This is possible simply by equating the energy lost though the beams with the decay of the plasmoid B field, allowing a calculation of the accelerating potential, beam current and decay time.

$$\tau = 6.2 \times 10^{-6} r_c/R_B = 8.2 \times 10^{-9} \mu^{-2/3} z^{-2/3} r/R_B$$

$$n\tau = 304 \mu^{4/3} z^{1/3} I^2 / rR_B$$

$$E_b = I_c R_B e/4\pi^2 = 0.24 \mu^{1/3} z^{1/3} IR_B$$

$$I_b = 0.24 \mu^{1/3} z^{1/3} I$$

Here, $\tau$ is plasmoid decay time, $R_B$ is the effective resistance of the beam, $n_c$ is plasmoid density, $E_b$ is average beam energy per electronic charge and $I_b$ is beam current. However, a modification must be imposed here. For low I and thus low accelerating potentials, all the particles in the plasmoid are evacuated through the beam without carrying all the energy away. In this case, the simple model will break down near the end of the plasmoid decay. However, for present purposes a suitable approximation simply reduces the plasma lifetime by the ratio of the accelerating potential to that needed to carry the entire plasmoid energy. To a good approximation, this factor turns out to be I/1.4 MA. For I>1.4 MA, this factor is unity.

The particle density increases with $\mu$ and z as well as with I, and decreases with increasing r. Physically this is a direct result of the greater compression ratio that occurs with heavier gases, as is clear from the above relations. We thus see that the crucial plasma parameter $n\tau$ improves with heavier gases. Indeed, this is a faster improvement than appears at first, since it can be shown that $R_B$ also decreases as $\mu^{-3/4}$. Assuming z and $\mu$ to be proportional, $n\tau$ thus increases as $\mu^{2.4}$.

These theoretical predictions are in good agreement with the results obtained experimentally. A value of 0.43 GG was obtained when these equations are used to predict, in agreement with the observed value of 0.4 GG. Similarly, the formulae yield $4.6 \times 10^{13}$ sec/cm³ as compared with the best-observed value of $9 \times 10^{13}$ and the average of $0.9 \times 10^{13}$.

Using these formulae and the HMFE equations it is possible to produce simulations of the plasmoid that give the thermonuclear yield, energy released in x-rays and in the beam for any given radius and magnetic field of the plasmoid. This invention discloses optimal conditions for the plasmoid based on these simulations. The formulae also determine, for a given mixture of hydrogen and boron, the electron and ion density of the plasmoid. Examples are shown in Table 2, which apply to decaborane, B10H14, and which indicated prefer conditions of r=8.6 microns, B=13 GG. For these conditions, electron density will be approximately $3.7 \times 10^{24}$/cc.

TABLE 2

| Radius (microns) | 8.6 | 8.6 | 8.6 | 8.6 | 8.6 | 8.6 |
|---|---|---|---|---|---|---|
| B(GG) | 9.0 | 10.0 | 11.0 | 12.0 | 13.0 | 14.0 |
| Gross Input (kJ) | 7.0 | 8.7 | 10.5 | 12.5 | 14.6 | 17.0 |
| X-ray/Input | 0.39 | 0.45 | 0.52 | 0.60 | 0.75 | 0.78 |
| Beam/Input | 0.84 | 0.91 | .94 | 0.94 | 0.92 | 0.87 |
| Beam + X-ray/Input | 1.23 | 1.36 | 1.46 | 1.54 | 1.67 | 1.65 |

For other conditions total output energy may be somewhat higher, but beam energy somewhat lower. The most optimal conditions will depend on the exact design of the energy conversion system, and the relative efficiencies of the x-ray and ion beams conversion devices. For the example conditions above, the formulae can be used to determine that the cathode radius will be about 3.7 cm, the peak current of about 2.8 MA and the fill pressure of about 31 torr.

Decaborane is a solid at room temperature and such a vapor pressure requires temperatures of 107° C., which means that in operation the cooling system of the reactor will, in this example, have to maintain this temperature for the electrodes, vacuum chamber and fuel chamber. For higher or lower pressures, this temperature would also be higher or lower, based on published vapor pressure tables. The range of parameters for an optimized system using decaborane are cathode radius of about 2 to 7 cm, current about 2 to 3.5 MA and fill pressure (e.g., proportional to $I^2/r^2$, where I is peak current and r is cathode radius) of about 15 to 60 torr. Other boron compounds can also be used, such as pentaborane. In the case of pentaborane, a gas at room temperature, control of the temperature the electrodes are no longer critical and can be adjusted to optimize the efficiency of the cooling system.

Angular momentum transfer and plasmoid formation. The appropriate choice of cathode radius, peak current and fill pressure is not enough to ensure the efficient formation of a plasmoid that contains the full magnetic energy input to the device. The process of plasmoid formation involves the development of kink instability in the current flow at the pinch and as such requires a certain amount of angular momentum. During the compression phase, angular momentum per unit mass is conserved, so this angular momentum can be derived from angular momentum present in the filament array at the time the compression begins. For the example cited above a rough measure of the angular momentum per unit mass required can be obtained by the formula $0.5 V_A r$, here $V_A$ is the Alfven's velocity (in this case $1.05 \times 10^9$ cm/sec) and r is the radius (e.g., about 8.6 microns). This yields a value of about $4.5 \times 10^5$ cm²/s.

Angular momentum can be imparted to the plasma sheath during the rundown by the interaction of the inward flowing electron flows and any small initial axial magnetic field (e.g., the small axial component of the earth's magnetic field). The JXB force accelerates the electrons slightly in the azimuthal direction, creating an azimuthal component to the current. This in turn increases the axial magnetic field and thus the azimuthal acceleration of the electrons. In this way, a very small initial magnetic field (or small, random initial azimuthal component in the current created by irregularities in the electrodes) can be rapidly magnified. For example, given a ratio of axial to total magnetic field $B_\theta/B_T = \sin\theta$ then any initial axial field will be amplified so that at the end of the run down $\theta = \theta_i e^{V_A\tau/r}$, where $\tau$ is the run down time. Thus final angular momentum per unit mass is $V_A r \theta_i e^{V_A\tau/r}$.

Since $V_A\tau/r$ is proportional to L/R, angular momentum is sensitively dependent on this ratio. If there is insufficient angular momentum, the plasmoid radius will be reduced in proportion to angular momentum and the total plasmoid energy and mass will be reduced as the cube of angular momentum. This sensitivity to initial very small angular momentum can in part explain the well-known shot-to-shot variability of plasma focus devices. Calculations show that if this natural amplification mechanism is relied on to provide angular momentum and the initial magnetic fields are ambient fields, L/R must be more than about 7 for high efficiency of energy transfer into the plasmoid. Indeed, in most optimized DPF device, this ratio exceeds 7 and can be as high as 17, implying that high $V_A$ and longer $\tau$ are desirable.

Since the $V_A$ at the cathode is fixed for optimal function at about 3.2 cm/microsecond and $V_A$ at the anode is 3.2 $R_a/R_c$ cm/microsecond. Anode radius is in turn limited by the thermal stress induced by the current passing through the anode. Thermomechanical studies indicate that for copper there is a minimum ratio of about 1 cm/MA of peak current, while for beryllium, which is stronger, the limit is 1 cm/2 MA. This comparison leads to the present invention's use of beryllium electrodes. Beryllium electrodes allow the high x-ray emission to mainly pass through beryllium. In contrast, copper electrodes may also be used; however, the high x-ray emission will erode the copper anode quickly.

For the 2.8 MA examples, an anode radius of about. 1.4 cm would be the minimum, leading to a $V_A$ at peak of about 8.35 cm/microsecond. For an L/r ratio of 7, a pulse length of approximately 1.8 microseconds would be required. A tapered anode ending with a 0.7 cm radius would involve a somewhat shorter pulse length around 1.35 microseconds. The skilled artisan will recognize that a different anode radius may be used depending on the particular application, for example electrodes of 0.5 cm to 4.0 cm. In addition, the shape, contour and profile of the electrode may be tailored to the particular application. For example, the electrode may have a constant diameter over the length of the electrode, however other electrodes may have a diameter that differs from region to region, e.g., tapered at one or both ends and so forth.

The disadvantage of such long electrodes is their high inductance, around about 20 nH. Since external inductance must exceed load inductance, total inductance in the system must be around about 45 nH leading to a total energy of at least about 176 kJ, well above the about 15 kJ or so fed into the plasmoid, which means energy recovery has to be exceedingly efficient. Even about a 1% loss in total energy recovery will represent about 16% of fusion energy gain. In this case, capacitance will be about 29 microfarads, and charging voltage about 100 kV.

A shorter electrode would have the advantage of requiring less total energy thus yielding lower losses in recovering energy inductively stored in the circuit. For example, about a 4 cm length would make possible a total circuit inductance of about 18 nH and a total energy of only 62 kJ. A 1% loss of recovered energy will then mean only a 4% loss of total fusion energy gain. In this example, there is a pulse length of about 0.54 microseconds, a capacitance of about 6.6 microfarads and a charging voltage of about 137 kV. However, such short electrodes will not produce the necessary amount of angular momentum, starting from ambient magnetic fields.

Injection of angular momentum. Rather than relying on amplification of the angular momentum generated by the interaction of the current with the ambient magnetic field, this invention injects a larger initial angular momentum. The present invention accomplishes this by either giving the cathode electrodes a slight helical twist around the axis of the device or by generating a small initial axial magnetic field by means of a helical coil, which is energized separately from the main power supply.

The tilt of the electrode or the strength of the initial magnetic field can be calculated from the above formulate or from a simulation of the rundown. In the example above of the 2.8 MA decaborane device with electrodes having a length of about 4 cm, a helical tilt of about 0.3 degrees or an initial axial magnetic field of about 200 G will be optimal. For other electrodes, the tilt may vary from 0.05 to 10 degrees and the field from 5 to 1,000 G. In each case, the initial angular momentum is such that, once amplified during the rundown, the angular momentum per unit mass is equal to that of the plasmoid.

By injecting initial angular momentum, the present invention allows the formation of optimally-sized plasmoids containing nearly all the energy present in the magnetic field of the device, even for relatively short electrodes. As discussed above, these relatively short electrodes in turn reduce overall device inductance and the total amount of energy that must be input to the capacitors, and thus the total amount that has to be recovered.

Viewed in another way, for a given electrode radius and length, the injection of angular momentum will greatly increase the angular momentum and thus the size of the plasmoid, and thus the energy yield from fusion reactions in the plasmoid. Approximately, fusion yield will increase as the fourth power of the amount of injected angular momentum.

This injection of angular momentum will benefit all applications of the plasma focus, not just the current application of fusion energy generation. In particular, by reliably injecting the same amount of angular momentum for each shot, the present invention will reduce the variability or neutron or x-ray yield from shot to shot, which is caused in part by the small random injections of ambient angular momentum.

Even with the use of injected angular momentum, there is a lower limit on the optimal length of the anode because the anode has to be substantially longer than the insulator. Experience from many DPF experiments show that the optimal insulator length is never less that about 0.7 times the anode radius and for small radii tends to be larger than the radius. Thus, the insulator length will tend to be more than about 2 cm and the anode length not much less than about 4 cm.

Energy recovery. At the time that the plasmoid is finished emitting its energy and ceases to exist, a large amount of energy is still tied up in the inductive elements of the circuit, although the current has fallen significantly from its peak. For example, for an 18 nH circuit described above, about 47 KJ will still be tied up in this fashion. The energy in the circuit can be recovered at high efficiency using with standard circuit design. In one preferred embodiment, a fast switch can be placed in the circuit between the DPF and the ground side of the main capacitor. After the plasmoid process is over, the switch can divert the current to a second capacitor bank, which can charge up as the current discharges from the inductors. When the current reaches zero, the switch can re-open, capturing the energy in the second capacitor. One skilled in the art can design other energy recovery circuits.

Energy conversion of x-rays. The x-ray pulse can be converted at high efficiency to electricity via the photoelectric effect. The converter is essentially a capacitor with multiple layers of thin metal films. One type of film, type A, serves as the electron emitter, converting the x-ray energy to that of mulit-keV electrons. These layers also serve as the ground electrodes of the capacitor. A second type of film, type B, serves to collect the emitted electrons and act as the cathode electrodes of the capacitor. In a single layer, x-rays impinge on metal film A, causing the emission of electrons with a range of energies. These electrons travel through a series of very thin films B, which are initially charged to an ascending series of voltages by an external circuit. When the electrons approach an electrode charged to a greater voltage V than their energy in electron volts, they turn back and are absorbed by the next lower electrode.

For high efficiency in converting the energy of the x-rays into the energy of the electrons, the converter design must ensure that nearly all the x-rays are absorbed in films A and that very little of the electrons energy is absorbed before they leave film A. This means that for electrons (and thus x-rays) of a given energy E the thickness of each film A must be small (e.g., from about 1 to about 10% and ideally less than about 5%) of the stopping distance in material A of electrons of that energy. At the same time the total thickness of all layers A must be at least 3 times the attenuation distance of x-rays of energy E in material A. In addition, x-ray absorbance in films B must be minimized by suitable choice of material B.

In practice, conversion efficiency can only be optimized for a range in x-ray energy considerably narrower than the range actually emitted from the plasmoid, so a series of collectors, nested concentrically, must be designed, with the collectors for lower energy x-rays closest to the plasma focus and those for higher energies further away. Additionally, the total capacitance of all layers for each x-ray energy range must be sufficient to capture the full energy emitted within that range.

The efficiency of conversion of the electron energy into stored electric energy is determined by the number of type B films per layer. If the voltages of the type B films are set so that each is 20% higher than its next lower neighbor, with the minimum voltage being slightly above the minimum x-ray energy and the maximum slightly above the maximum x-ray nervy for a given range, the average conversion efficiency will be about 90%. On the other hand, the B films cannot be set so close together that the field between them exceeds the dielectric breakdown of the insulators that separate and physically support each film. In general, the collectors optimized for lower energies will have relatively light type A material, for example aluminum, so as not to require excessively thin films, while copper will be used for intermediate energies and heavier metals such as tungsten for the highest energies. In most cases, type B materials will be light metals to minimize x-ray absorption, e.g., aluminum and beryllium.

For example, a collector optimized for a 10 kJ, 3 ns long pulse of x-rays, with a distribution of energies from about 10 keV to 80 keV, with about half the energy below 20 keV. There are 7 type B films for each type A film with the x-ray converter having three optimized converters with the parameters described in Table 2. In this example, about 95% of x-ray energy is converted to electron energy, about 95% of electron energy escapes the type A films and about 90% of escaped electron energy is stored as electrical energy, for an overall about 81% conversion efficiency of x-ray energy into stored electrical energy.

TABLE 3

| Energy Range (kev) | Total Energy Energy (kj) | Capacitance (mf) | # Of Layers | Material | Type A Thick (m) | Layer Thick(m) |
| --- | --- | --- | --- | --- | --- | --- |
| 10-20 | 2.6 | 52 | 3000 | aluminum | 0.1 | 33 |
| 20-40 | 3.9 | 22 | 1400 | Copper | 0.09 | 70 |
| 40-80 | 3.5 | 15 | 1000 | Tungsten | 0.17 | 110 |

The type B electrodes at a given potential are connected to each other through appropriately spaced and insulated conductors that parallel the cooling system, described below, while the type A electrodes are similarly connected together to ground.

Energy conversion of ion beam. Existing art can be used to efficiently collect energy from the ion beam. Either peniotron converters (e.g., Yoshikawa et al) or gyrotrons can be used to couple the ion beams efficiently to a RF pulse. A series of fast switches (e.g., diamond switches) activated by UV light, can be used to couple the RF pulse into fast storage capacitors, with the switch opening when the capacitors are charged, preventing energy from flowing back into the resonator. The ion beam spreads in flight, but still has a short pulse length of about 30 ns when it arrives at the converter creating a rapidly varying magnetic field, make it easier to optimize an efficient design to couple the energy into a circuit. However, the high power (e.g., about 500 GW) requires careful design of the circuit to link the transfer the power into capacitors at reasonable potentials. The basic considerations are clear to one skilled in the art.

Overall operation and circuitry of reactor. The reactor operates in three phases for each pulse. In the first phase, energy is transferred from the main storage capacitors into the DPF and then into the plasmoid. In the second phase, thermonuclear energy is generated in the plasmoid and its energy, e.g., in the form of x-rays and an ion beam, is converted to electricity and stored in secondary capacitors. Subsequently, the remaining energy stored in the power circuit is transferred into another secondary capacitor. So at the end of the second phase, the initial energy of the pulse plus the net fusion energy gain is stored in three capacitor banks. In the third phase, the three secondary banks are used to recharge than main capacitor bank while the net energy gain can be output as a steady DC current to the grid, or converted to AC current. The circuit is indicated schematically here and the details of the switching systems are clear to one skilled in the art.

Generally, the pulse rate is above a minimum determined by the re-combination of the filling gas. It is highly desirable to maintain the fill gas in a plasma state so that the boron will not plate out on the electrodes. In addition, re-ionization of the gas is costly in terms of energy. Since typical recombination radiation times are of the order of several tens of milliseconds, for optically thick plasmas a pulse rate of at least 1 kHz is required. Maximum pulse rates are limited by the cooling system, as described below.

Cooling system. Generally, the cooling system removes heat from the anode, the x-ray conversion system and the ion beam conversion system. The anode is the most demanding, as it is the smallest. For example, an anode with a radius of about 1.4 cm and length of about 4 cm, the anode has a surface area of about 35 $cm^2$. A beryllium anode will absorb through internal resistance about 100 J for each pulse of about 2.8 MA and about 0.5 microseconds. Since the maximum heat removal rate is generally considered to be around 2.5 kW/cm2, a pulse rate of about 1 kHz is about the maximum that can be used for a single electrode. Since this is far less than the 500 kHz cycle time of the main capacitors, several electrode sets could be run from a single bank of capacitors. For example, about 5 MW of net output could then be expected for each electrode set.

Since the ion beam energy conversion system has a large surface area and the residual heat is distributed within it, cooling it is relatively routine to the skilled artisan. In the case of the x-ray conversion system, however, care must be taken to avoid blocking the x-rays or electrons with the coolant itself by passing an electrically non-conducting coolant, such as silicone, through several dozen very narrow pair of plates, all oriented radially toward the plasmoid. If the coolant plates have a typical separation of a few tens of microns, they absorb less than about 1% of the radiation, but are still able to carry adequate coolant flow to remove about 2 MW of waste heat from the x-ray conversion device. The coolant plates, running radially through the device every several degrees can also serve to give mechanical support to the thin film electrodes.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions, devices and methods of this invention have been described in terms of preferred embodiments, it will be apparent to those of skill in the art that variations can be applied to the compositions, devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

McNally, J. Rand, Nucl. Fusion, 15, 344 (1975).
J. Galambos and G. H. Miley, Nucl. Tech./Fusion, 4, 241 (1983).
G. S. Miller, E. E. Salpeter, and I. Wasserman, ApJ, 314, 215 (1987).
Eric J. Lerner, "Prospects for P11B Fusion with the Dense Plasma Focus: New Results" Proceedings of the 5th Symposium "Current Trends in International Fusion Research: A Review" Mar. 24-28, 2003, Washington, D.C., also http://arxiv.org/abs/physics/0401126.
Lerner, E. J. Laser and Particle Beams, 4, Pt. 2, 193(1986).
Lerner, E. J., Peratt, A. L., Final Report, Jet Propulsion Laboratory contract 959962 (1995).
K. Yoshikawa et al, Fusion Technology, 19, 870 (1991).

What is claimed is:

1. A device for producing x-rays and particle beams comprising:
    an anode and a cathode separated by an insulator and positioned coaxially and at least partially within a reaction chamber, wherein the cathode has a helical twist that imparts angular momentum;
    a gas contained within the reaction chamber; and
    an electronic discharge source in electrical communication with the anode and the cathode, wherein a dense, magnetically confined, plasmoid is created about the anode as a result of an electronic discharge and emits one or more ion beams, one or more x-rays or a combination thereof.

2. The device of claim 1, wherein the anode has an anode radius and the cathode has a cathode radius that imparts a high magnetic field.

3. The device of claim 1, wherein the anode radius is between about 0.25 and 1.5 cm times the peak current in the device measured in mega-amperes and the cathode radius is between about 0.5 and about 3 times the peak current in the device measured in mega-amperes.

4. The device of claim 1, wherein the anode radius less than about 1.5 cm times the peak current in the device measured in mega-amperes and the cathode radius is less than about 3 times the peak current in the device measured in mega-amperes.

5. The device of claim 1, wherein the cathode comprises one or more individual electrodes positioned about the anode.

6. The device of claim 1, wherein the anode or cathode comprise beryllium, copper or combination thereof.

7. The device of claim 1, further comprising a helical coil positioned about the cathode to impart angular momentum.

8. The device of claim 1, wherein the gas comprises a borane.

9. The device of claim 1, wherein the gas comprises hydrogen, helium, nitrogen, methane, neon, argon, xenon or combination thereof.

10. A device for producing x-rays and particle beams comprising:
    an anode and a cathode separated by an insulator and positioned coaxially and at least partially within a reaction chamber, wherein a helical coil is positioned about the cathode to impart angular momentum;
    a gas contained within the reaction chamber; and
    an electronic discharge source in electrical communication with the anode and the cathode, wherein a dense, magnetically confined, plasmoid is created about the anode as a result of an electronic discharge and emits one or more ion beams, one or more x-rays or a combination thereof.

11. The device of claim 10, wherein the anode has an anode radius and the cathode has a cathode radius that imparts a high magnetic field.

12. The device of claim 11, wherein the anode radius is between about 0.25 and 1.5 cm times the peak current in the device measured in mega-amperes and the cathode radius is between about 0.5 and about 3 times the peak current in the device measured in mega-amperes.

13. The device of claim 11, wherein the anode radius less than about 1.5 cm times the peak current in the device measured in mega-amperes and the cathode radius is less than about 3 times the peak current in the device measured in mega-amperes.

14. The device of claim 10, wherein the cathode comprises one or more individual electrodes positioned about the anode.

15. The device of claim 10, wherein the anode or cathode comprise beryllium, copper or combination thereof.

16. A fusion energy generator for releasing fission energy and converting fusion energy into electrical energy comprising:
an anode and a cathode separated by an insulator and positioned coaxially and at least partially within a reaction chamber, wherein the anode has an anode radius and the cathode has a cathode radius that imparts a high magnetic fields;
a borane fuel source contained within the reaction chamber; and
an electronic discharge source in electrical communication with the anode and the cathode, wherein a plasmoid is created about the anode and results in the generation of fusion energy and the emission of one or more x-rays and one or more ion beams from the plasmoid.

17. The device of claim 16, wherein the borane fuel source comprises decaborane.

18. The device of claim 16, wherein the anode radius is between about 0.25 and 1.5 cm times the peak current in the device measured in mega-amperes and the cathode radius is between about 0.5 and about 3 times the peak current in the device measured in mega-amperes.

19. The device of claim 16, wherein the anode radius less than about 1.5 cm times the peak current in the device measured in mega-amperes and the cathode radius is less than about 3 times the peak current in the device measured in mega-amperes.

20. The device of claim 16, wherein the cathode comprises one or more individual electrodes positioned about the anode.

21. The device of claim 16, wherein the cathode has a helical twist that imparts angular momentum.

22. The device of claim 16, wherein a helical coil is positioned about the cathode to impart angular momentum.

23. The device of claim 16, further comprising an x-ray energy converter for directly converting x-ray emissions into electrical energy comprising:
one or more electron emitter layers in electrical communication with one or more electron collector layers, wherein the one or more electron emitter layers adsorbs the one or more x-rays and emits electrons that are adsorbed by the one or more electron collector layers.

24. The device of claim 23, wherein the one or more electron collector layers are nested concentrically and one or more electron collector layers absorb one or more electrons of different energy.

25. The device of claim 23, further comprising one or more x-ray energy converter nested concentrically to collect x-rays of different energy levels.

26. The device of claim 23, wherein each of the one or more electron collector layers are separated by a voltage of between about 15% and about 25% relative to the next electron collector layer.

27. A method of producing x-rays and one or more particle beams comprising the steps of:
interconnecting an anode and a cathode separated by an insulator and positioned coaxially with an electronic discharge source, wherein the cathode has a helical twist that imparts angular momentum;
forming a plasma sheath from a gas with a magnetic field through the discharge of an electrical current pulse across the anode and the cathode;
forming a plasmoid about the anode as a result of the magnetic field; and
emitting from the plasmoid one or more ion beams, one or more x-rays or a combination thereof, wherein the emission is a result of decay of the plasmoid magnetic field and the collisions of the electrons and ions in the plasmoid.

28. The method of claim 27, wherein the anode has an anode radius and the cathode has a cathode radius that imparts a high magnetic field.

29. The method of claim 28, wherein the anode radius is between about 0.25 and 1.5 cm times the peak current in the device measured in mega-amperes and the cathode radius is between about 0.5 and about 3 times the peak current in the device measured in mega-amperes.

30. The method of claim 28, wherein the anode radius less than about 1.5 cm times the peak current in the device measured in mega-amperes and the cathode radius is less than about 3 times the peak current in the device measured in mega-amperes.

31. The method of claim 27, wherein the cathode comprises one or more individual electrodes positioned about the anode.

32. The method of claim 27, wherein the anode or cathode comprise beryllium, copper or combination thereof 33. The method of claim 27, wherein a helical coil is positioned about the cathode to impart angular momentum.

34. The method of claim 27, wherein the gas comprises a borane.

35. The method of claim 27, wherein the gas comprises hydrogen, helium, nitrogen, methane, neon, argon, xenon or combination of same.

36. A method for the release of fusion energy and for converting the fusion energy into electrical energy comprising the steps of:
interconnecting an anode and a cathode separated by an insulator and positioned coaxially with an electronic discharge source, wherein the anode has an anode radius and the cathode has a cathode radius that imparts a high magnetic fields;
forming a plasma sheath from a gas with a magnetic field through the discharge of an electrical current pulse across the anode and the cathode;
forming a plasmoid about the anode through the discharge of an electrical current pulse across the anode and the cathode;
generating fusion energy in the plasmoid through the heating of the plasmoid; and
emitting fusion energy from the plasmoid as a result of the decay of the magnetic field of the plasmoid and the collisions of the electrons and ions in the plasmoid, wherein the fusion energy is carried by one or more charged particles and x-rays.

37. The method of claim 36, wherein the gas comprises decaborane.

38. The method of claim 36, wherein the anode radius is between about 0.25 and 1.5 cm times the peak current in the device measured in mega-amperes and the cathode radius is between about 0.5 and about 3 times the peak current in the device measured in mega-amperes.

39. The method of claim 36, wherein the anode radius less than about 1.5 cm times the peak current in the device measured in mega-amperes and the cathode radius is less than about 3 times the peak current in the device measured in mega-amperes.

40. The method of claim 36, wherein the cathode comprises one or more individual electrodes positioned about the anode.

41. The method of claim 36, wherein the cathode has a helical twist that imparts angular momentum.

42. The method of claim 36, wherein a helical coil is positioned about the cathode to impart angular momentum.

* * * * *